(12) United States Patent
Sue et al.

(10) Patent No.: US 10,599,009 B2
(45) Date of Patent: Mar. 24, 2020

(54) OPTICAL UNIT WITH SHAKE CORRECTION FUNCTION AND HAVING A ROLLING DRIVE MECHANISM

(71) Applicant: NIDEC SANKYO CORPORATION, Suwa-gun, Nagano (JP)

(72) Inventors: Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 53 days.

(21) Appl. No.: 15/809,093

(22) Filed: Nov. 10, 2017

(65) Prior Publication Data
US 2018/0129118 A1 May 10, 2018

(30) Foreign Application Priority Data
Nov. 10, 2016 (JP) .................................. 2016-219850

(51) Int. Cl.
*G02B 27/64* (2006.01)
*G03B 5/06* (2006.01)
*G03B 15/00* (2006.01)

(52) U.S. Cl.
CPC .............. *G03B 5/06* (2013.01); *G02B 27/646* (2013.01); *G03B 15/006* (2013.01); *G03B 2205/0023* (2013.01); *G03B 2205/0069* (2013.01)

(58) Field of Classification Search
CPC .. G02B 27/64; G02B 27/646; H04N 5/23248; H04N 5/23264; H04N 5/2328; H04N 5/23287
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS 10,110,816 B2 * 10/2018 Asakawa ............. G03B 17/561
2018/0307004 A1 * 10/2018 Nagaoka ................ G02B 7/102

FOREIGN PATENT DOCUMENTS

JP          2015082072 A      4/2015

* cited by examiner

*Primary Examiner* — Arnel C Lavarias
(74) *Attorney, Agent, or Firm* — Cantor Colburn LLP

(57) ABSTRACT

An optical unit with a shake correction function may include a movable body having an optical module, a swing support mechanism, and a holder; a fixed body which turnably holds the movable body around the axial line; a magnetic swing drive mechanism structured to swing the optical module; and a magnetic rolling drive mechanism structured to turn the movable body around the axial line. The magnetic rolling drive mechanism may include a rolling drive magnet which is fixed to the fixed body and a rolling drive coil and a magnetic sensor which are fixed to the movable body so as to face the rolling drive magnet. Power feeding to the rolling drive coil may be controlled based on an output from the magnetic sensor so as to set the movable body at a home position around the axial line.

18 Claims, 15 Drawing Sheets

OPTICAL UNIT WITH SHAKE CORRECTION FUNCTION AND HAVING A ROLLING DRIVE MECHANISM

CROSS REFERENCE TO RELATED APPLICATION

The present invention claims priority under 35 U.S.C. § 119 to Japanese Application No. 2016-219850 filed Nov. 10, 2016, the entire content of which is incorporated herein by reference.

FIELD OF THE INVENTION

At least an embodiment of the present invention may relate to an optical unit with a shake correction function which is mounted on a portable terminal or a movement body.

BACKGROUND

An imaging device which is mounted on a portable terminal or a movement body such as a vehicle and an unmanned helicopter includes an optical unit on which an optical module for photographing is mounted. This type of an optical unit is required to suppress disturbance of a photographed image due to a shake of an imaging device. Therefore, in Japanese Patent Laid-Open No. 2015-82072, an optical unit with a shake correction function has been proposed which includes a swing drive mechanism structured to swing an optical module in a pitching (vertical swing: tilting) direction and in a yawing (lateral swing: panning) direction and a rolling drive mechanism structured to turn the optical module around an optical axis.

The optical unit with a shake correction function described in the above-mentioned Patent Literature includes an optical module which holds an optical element, a swing support mechanism which swingably supports the optical module, a holder which supports the optical module through the swing support mechanism, a turnable support mechanism which turnably supports a case, and a fixed body which supports the case through the turnable support mechanism. Further, the optical unit with a shake correction function described in the above-mentioned Patent Literature includes a magnetic swing drive mechanism structured to swing the optical module and a magnetic rolling drive mechanism structured to turn the case supporting the optical module. The magnetic swing drive mechanism is structured between the optical module and the case. In other words, the magnetic swing drive mechanism includes a swing drive coil fixed to the optical module and a swing drive magnet fixed to the case. The magnetic rolling drive mechanism is structured between the case and the fixed body. In other words, the magnetic rolling drive mechanism includes a rolling drive magnet fixed to the case and a rolling drive coil fixed to the fixed body. The optical module, the case, the swing support mechanism and the magnetic swing drive mechanism (swing drive magnet and swing drive coil) structure a movable body which is turnable with respect to the fixed body.

In the above-mentioned Patent Literature, the movable body and the fixed body are connected with each other through a mechanical spring. The mechanical spring is provided with a movable body side fixing part which is fixed to the movable body, a fixed body side fixing part which is fixed to the fixed body, and an arm part which connects the movable body side fixing part with the fixed body side fixing part.

The mechanical spring is structured so as to make the movable body return to a predetermined home position around an axial line when the movable body is turned (displaced) around the axial line. In this case, an arm part of the mechanical spring is formed in an extremely thin and curved shape for restraining generation of a force which obstructs displacement of the movable body with respect to the fixed body. Therefore, it is not easy to structure the mechanical spring and is not easy to handle it when the device is to be assembled.

SUMMARY

In view of the problem described above, at least an embodiment of the present invention may advantageously provide an optical unit with a shake correction function which is capable of returning a movable body to a home position around an axial line without using a spring member.

According to at least an embodiment of the present invention, there may be provided an optical unit with a shake correction function comprising a movable body which includes an optical module which holds an optical element, a swing support mechanism structured to swingably support the optical module between a reference posture where a predetermined axial line and an optical axis are coincided with each other and an inclined posture where the optical axis is inclined with respect to the axial line, and a holder which holds the optical module through the swing support mechanism, a fixed body which turnably holds the movable body around the axial line, a magnetic swing drive mechanism structured to swing the optical module, and a magnetic rolling drive mechanism structured to turn the movable body around the axial line. The magnetic rolling drive mechanism includes a rolling drive magnet which is fixed to one of the movable body and the fixed body, a rolling drive coil and a magnetic sensor which are fixed to the other of the movable body and the fixed body so as to face the rolling drive magnet. The rolling drive magnet is polarized and magnetized in a circumferential direction around the axial line, and power feeding to the rolling drive coil is controlled based on an output from the magnetic sensor so as to set the movable body at a predetermined home position around the axial line.

According to at least an embodiment of the present invention, when the movable body is turned around the axial line, an output from the magnetic sensor becomes a value corresponding to a turning angle position of the movable body around the axial line. Therefore, when power feeding to the rolling drive coil is controlled based on an output from the magnetic sensor, the movable body including the optical module can be set at the home position around the axial line. Accordingly, the movable body including the optical module can be returned to the home position around the axial line without using a spring member or the like.

In at least an embodiment of the present invention, the magnetic sensor faces a magnetized polarizing line of the rolling drive magnet at the home position. According to this structure, the home position is easily obtained based on an output from the magnetic sensor.

In at least an embodiment of the present invention, the optical unit with a shake correction function further includes a turning angle range restriction mechanism structured to restrict a turning angle range over which the movable body is turnable around the axial line, and a storage part in which an output value outputted from the magnetic sensor when the movable body is located at a center of the turning angle range is memorized, and the output value memorized in the storage part and an output from the magnetic sensor are coincided with each other at the home position. According to this structure, the home position can be obtained based on an output from the magnetic sensor.

In at least an embodiment of the present invention, the optical unit with a shake correction function further includes a turnable support mechanism structured to turnably support the holder around the axial line. The fixed body holds the holder through the turnable support mechanism, and the rolling drive magnet is fixed to one of the holder and the fixed body, and the rolling drive coil and the magnetic sensor are fixed to the other of the holder and the fixed body. Specifically, it may be structured that the rolling drive magnet is fixed to the fixed body, and the rolling drive coil and the magnetic sensor are fixed to the holder. According to this structure, the movable body is easily turnably held by the fixed body. Further, the movable body is easily turned around the axial line by the magnetic rolling drive mechanism.

In at least an embodiment of the present invention, in order to swing the optical module, the magnetic swing drive mechanism includes a swing drive magnet which is fixed to one of the optical module and the fixed body, and a swing drive coil which is fixed to the other of the optical module and the fixed body so as to face the swing drive magnet. Specifically, it may be structured that the magnetic swing drive mechanism includes a swing drive magnet which is fixed to the fixed body and a swing drive coil which is fixed to the optical module so as to face the swing drive magnet. Further, in this case, it may be structured that the optical module is held by the holder through a gimbal mechanism which is the swing support mechanism.

Further, in at least an embodiment of the present invention, in order to swing the optical module, the movable body includes the magnetic swing drive mechanism, and the magnetic swing drive mechanism includes a swing drive magnet which is fixed to one of the optical module and the holder, and a swing drive coil which is fixed to the other of the optical module and the holder so as to face the swing drive magnet.

In at least an embodiment of the present invention, the optical unit with a shake correction function further includes a control part structured to control power feeding to the rolling drive coil based on an output from the magnetic sensor. In this case, it may be structured that the control part sets a position where the magnetic sensor faces a magnetized polarizing line of the rolling drive magnet as the home position. Alternatively, the optical unit with a shake correction function further includes a turning angle range restriction mechanism structured to restrict a turning angle range over which the movable body is turnable around the axial line, and a storage part in which an output value outputted from the magnetic sensor when the movable body is located at a center of the turning angle range is memorized, and the control part sets a position where the output value memorized in the storage part and an output from the magnetic sensor correspond with each other as the home position.

In at least an embodiment of the present invention, the rolling drive coil is formed in a frame shape whose center portion is opened, and the magnetic sensor is disposed in an opening of the rolling drive coil which is formed in the frame shape. Specifically, it may be structured that the rolling drive coil is formed in a substantially rectangular frame shape whose two long sides are extended in an axial line direction, the magnetic sensor is disposed at a middle position in the circumferential direction with respect to the two long sides, and the magnetic sensor faces a magnetized polarizing line of the rolling drive magnet at the home position. According to this structure, the magnetic sensor can be disposed by utilizing a free space in the opening of the rolling drive coil. Further, according to this structure, the magnetic sensor is easily faced to the magnetized polarizing line of the rolling drive magnet.

In at least an embodiment of the present invention, the optical unit with a shake correction function further includes a temperature sensor, and the temperature sensor is disposed in the opening of the rolling drive coil. Characteristics of a magnetic sensor such as a Hall element are varied due to heat. Further, temperature in a space surrounded by the rolling drive coil is varied due to heat generated by the rolling drive coil through power feeding. Therefore, when the temperature sensor is disposed in the vicinity of the magnetic sensor and an output from the magnetic sensor is corrected based on an output (temperature) from the temperature sensor, lowering of accuracy of shake correction caused by temperature change can be restrained in the rolling direction.

In at least an embodiment of the present invention, the magnetic sensor is capable of facing a center of the rolling drive magnet in an axial line direction. According to this structure, the magnetic sensor can be disposed at a position where its magnetic flux is relatively strong and thus an output from the magnetic sensor can be secured.

As described above, according to the optical unit with a shake correction function in accordance with at least an embodiment of the present invention, the home position around the axial line of the movable body including the optical module can be obtained based on an output from the magnetic sensor. Further, power feeding to the rolling drive coil is controlled based on an output from the magnetic sensor and, as a result, a shake correction around the axial line of the movable body including the optical module can be performed. Therefore, the movable body including the optical module can be returned to the home position around the axial line without using a spring member or the like.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of an optical unit with a shake correction function to which the present invention is applied will be described below with reference to the accompanying drawings.

(Entire Structure)

In this specification, three-axes of "X", "Y" and "Z" are directions perpendicular to each other. One side in an "X"-axis direction is indicated with "+X", the other side is indicated with "−X", one side in a "Y"-axis direction is indicated with "+Y", the other side is indicated with "−Y", one side in a "Z"-axis direction is indicated with "+Z", and the other side is indicated with "−Z". The "Z"-axis (axial line) direction is a direction along an optical axis "L" of an optical module 4 mounted on a movable body 10 in a state that the movable body 10 of an optical unit 1 with a shake correction function is not swung. Further, the "−Z" direction is an image side in an optical axis "L" direction, and the "+Z" direction is an object side (object to be photographed side) in the optical axis "L" direction.

Figure 1A:
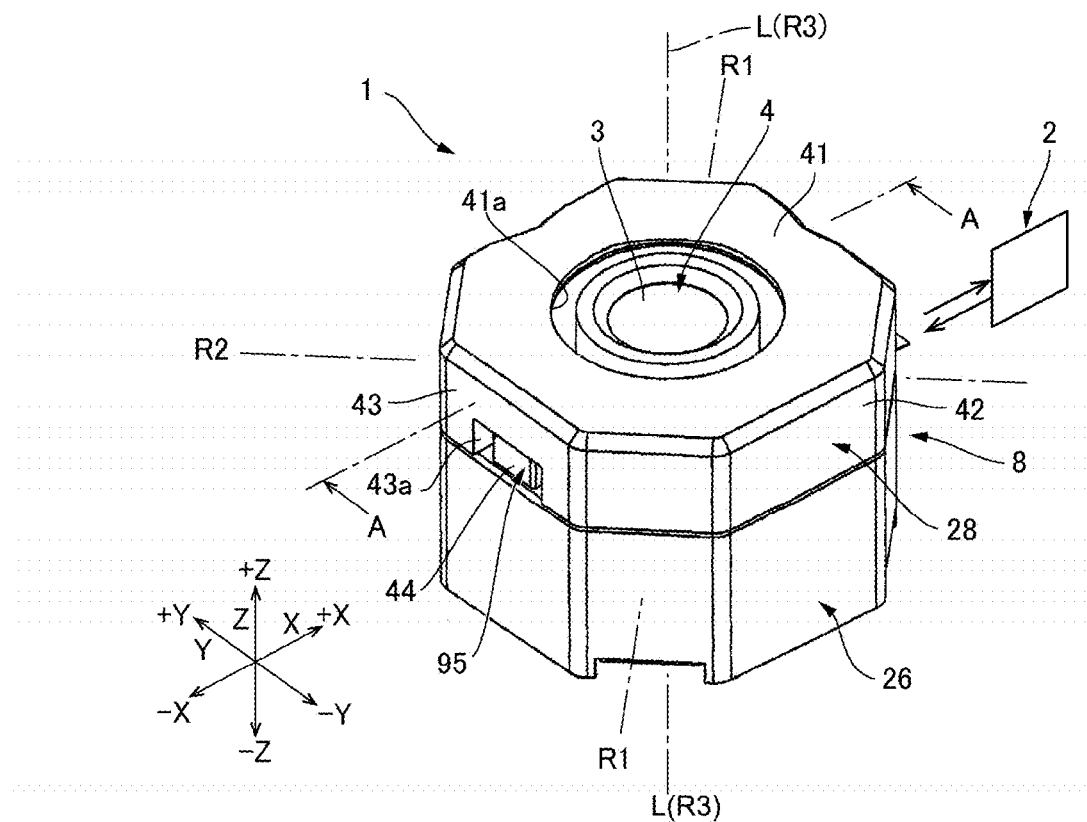
FIGS. 1A and 1B are perspective views showing an optical unit with a shake correction function in accordance with an embodiment of the present invention which is viewed from an object side.
Figure 1B:
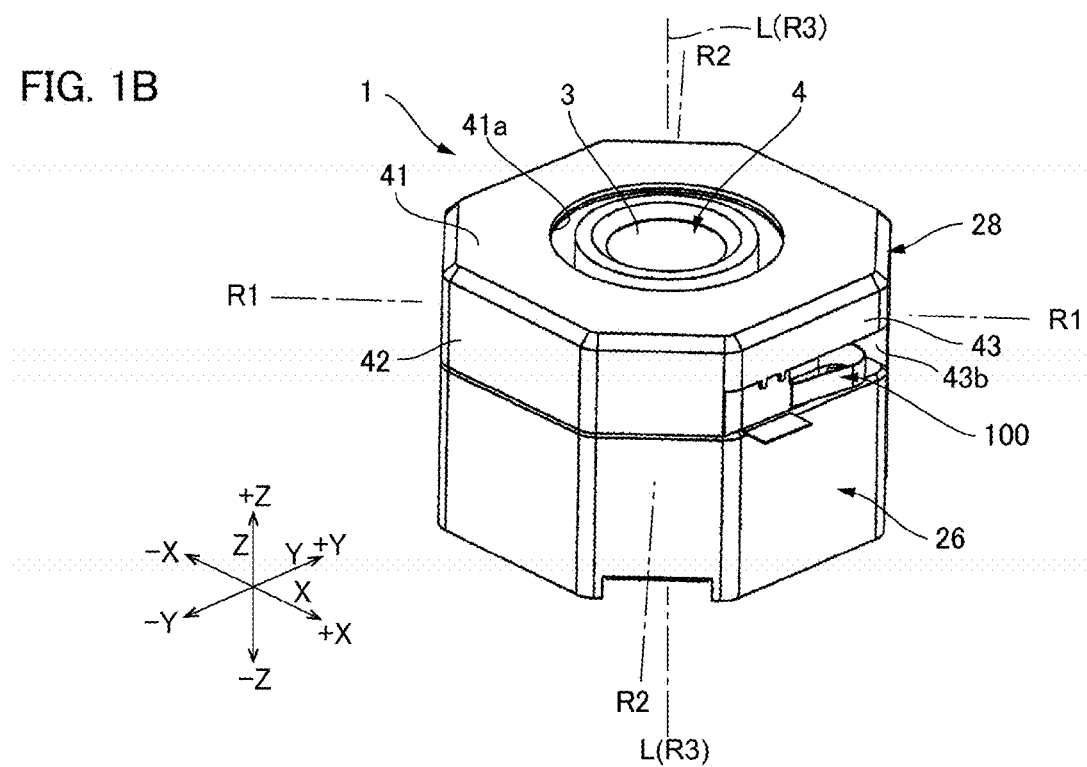
Figure 2:
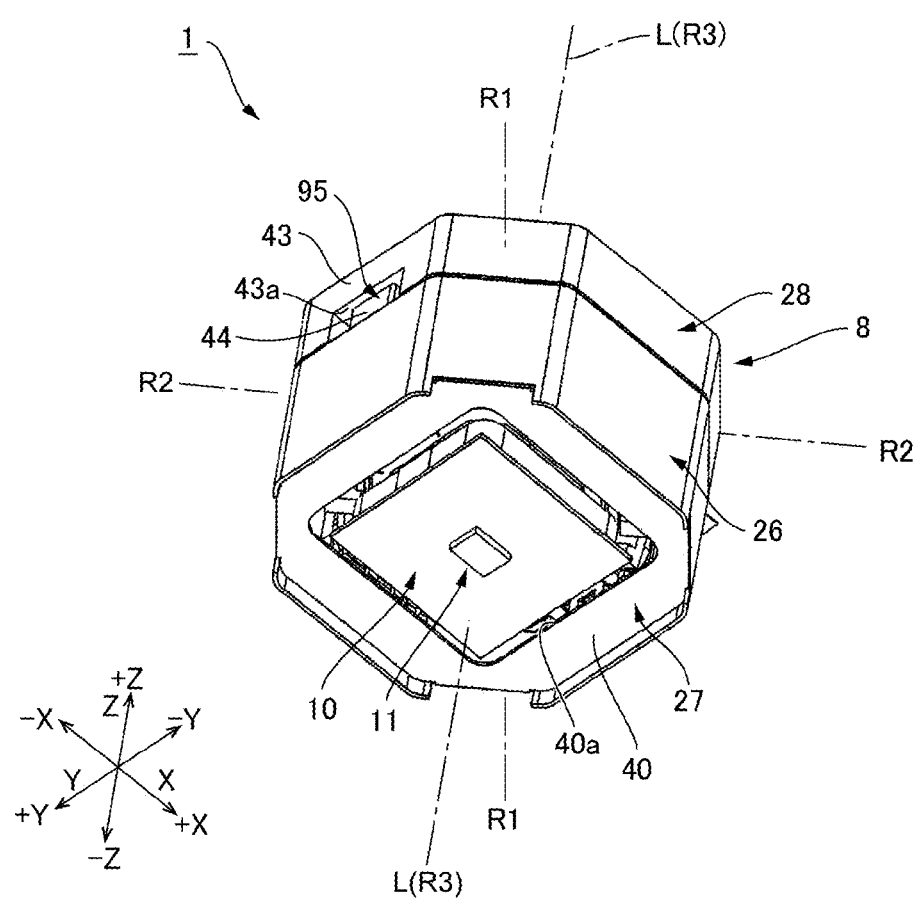
FIG. 2 is a perspective view showing the optical unit with a shake correction function which is viewed from an image side.
Figure 3:
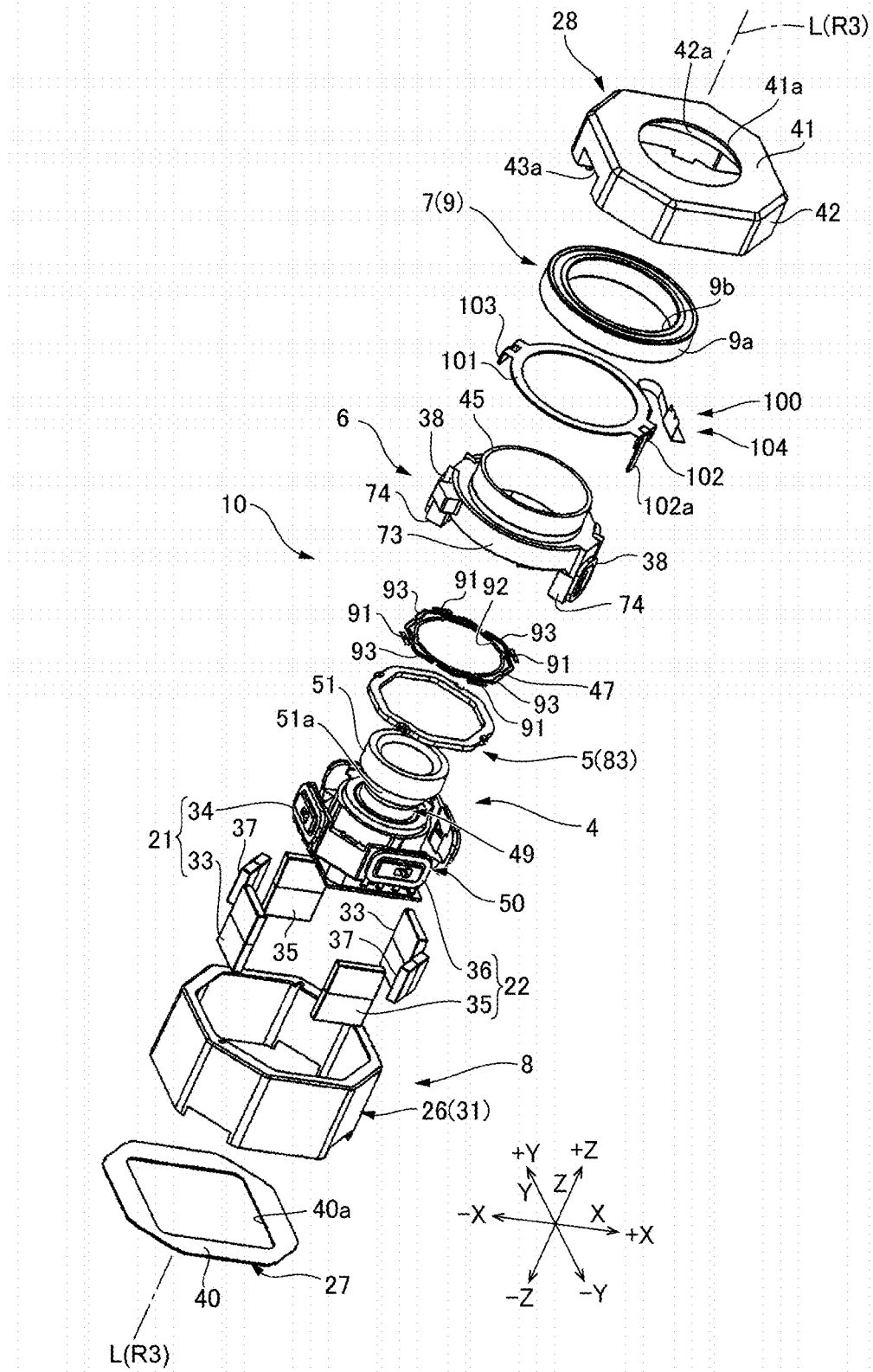
FIG. 3 is an exploded perspective view showing the optical unit with a shake correction function shown in FIGS. 1A and 1B which is viewed from an object side.
Figure 4:
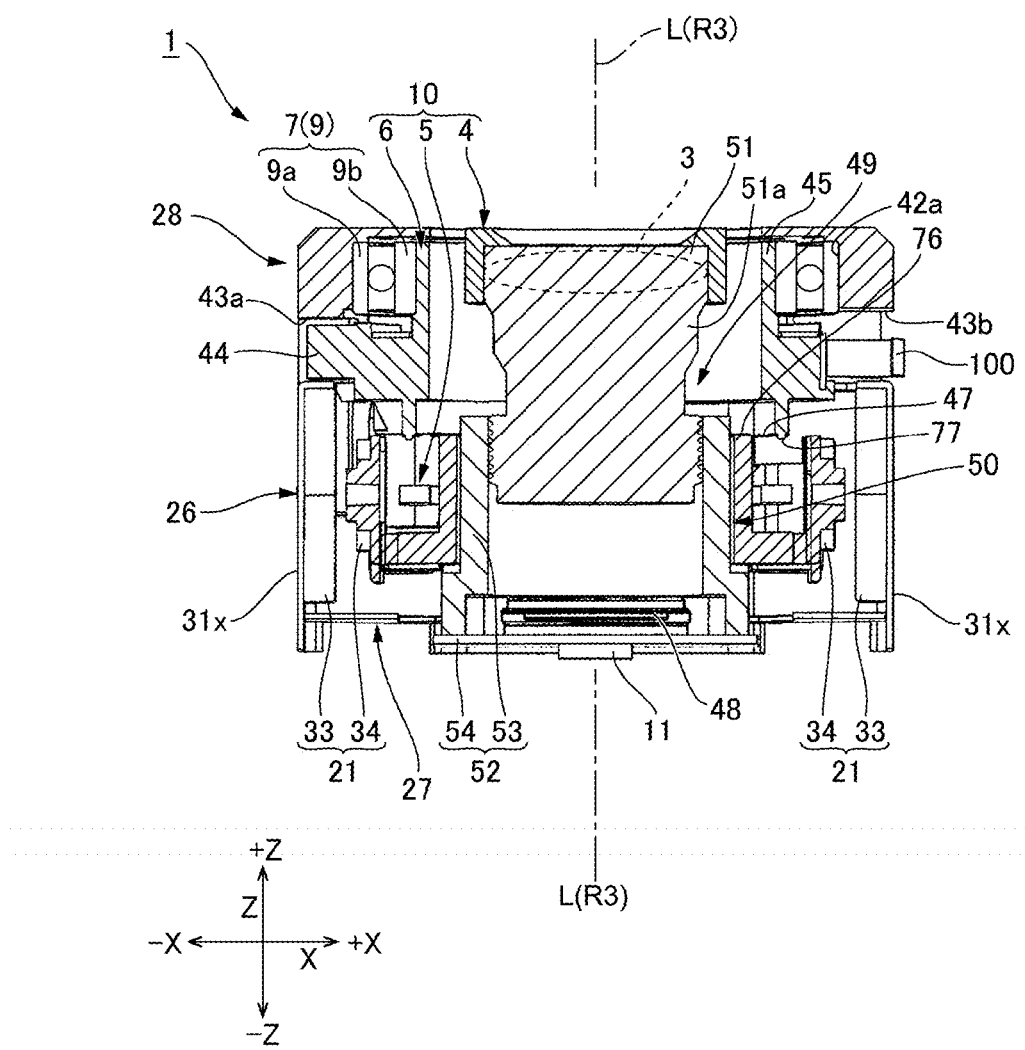
FIG. 4 is a cross-sectional view showing the optical unit with a shake correction function which is cut by the "A-A" line in FIG. 1A.
Figure 5A:
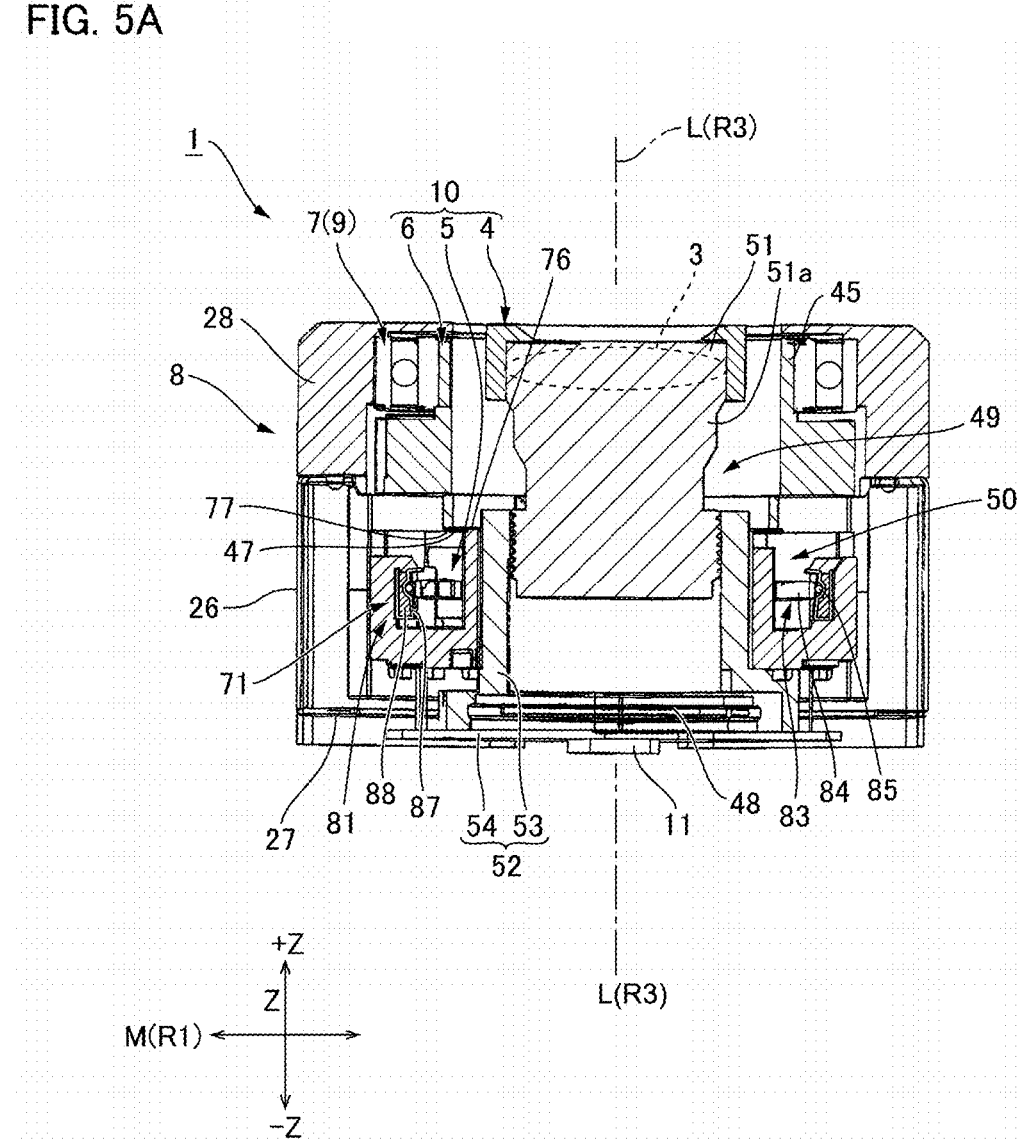
FIGS. 5A and 5B are cross-sectional views showing the optical unit with a shake correction function which is cut by the plane passing the first axial line in FIGS. 1A and 1B in the "Z"-axis direction.
Figure 5B:
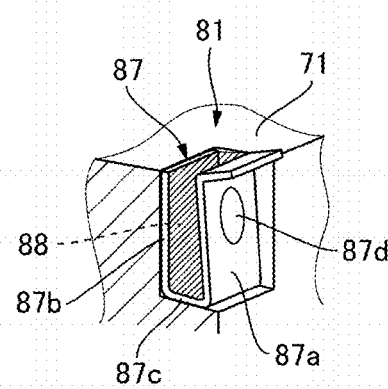
Figure 6A:
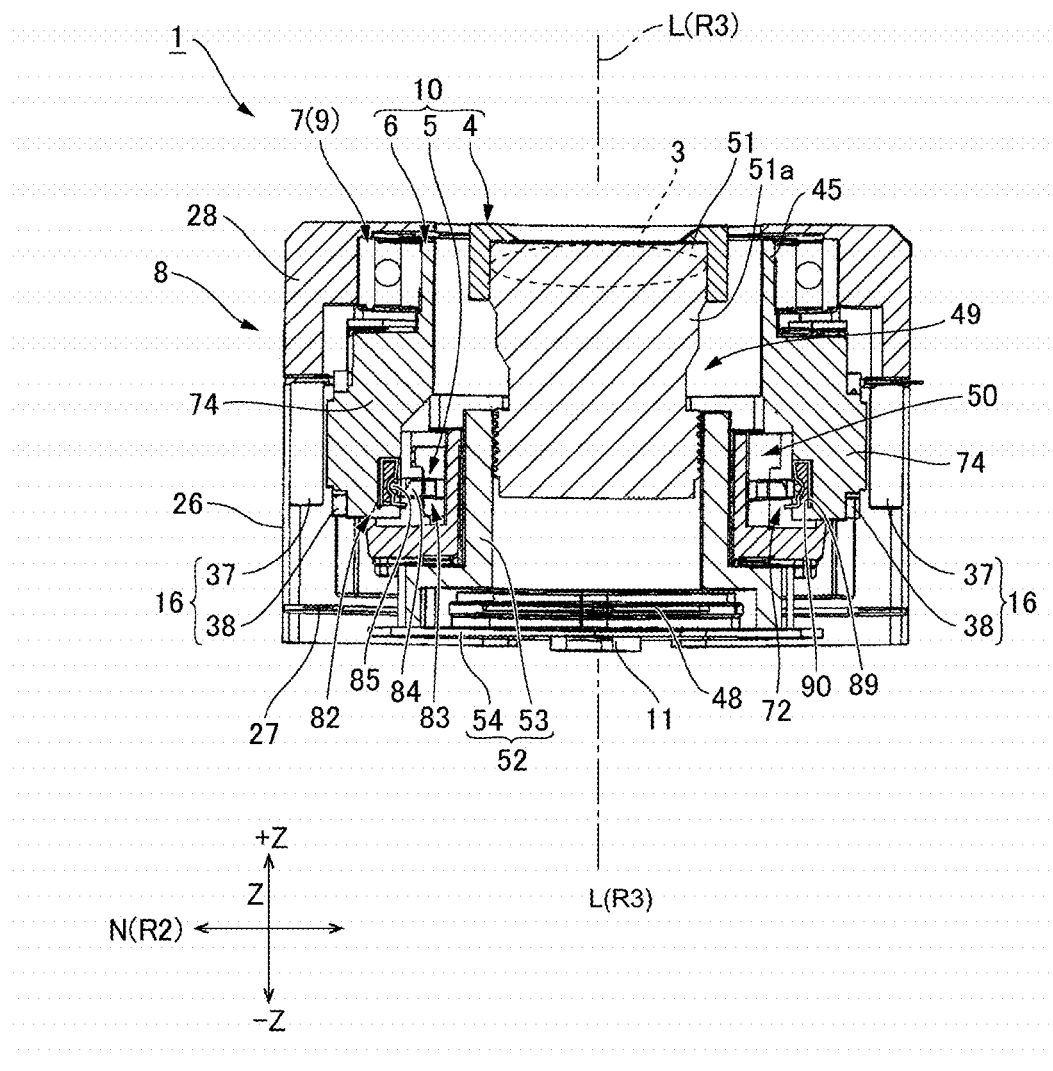
FIGS. 6A and 6B are cross-sectional views showing the optical unit with a shake correction function which is cut by the plane passing the second axial line in FIGS. 1A and 1B in the "Z"-axis direction.
Figure 6B:
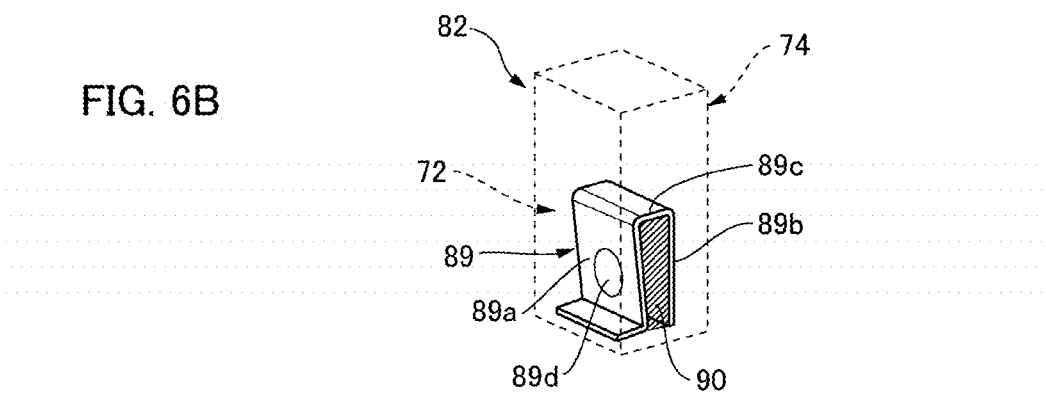

FIGS. 1A and 1B are perspective views showing an optical unit 1 with a shake correction function which is viewed from the "+Z" direction side. In FIG. 1A, the optical unit 1 with a shake correction function is viewed from the "−X" direction side and the "−Y" direction side and, in FIG. 1B, the optical unit 1 with a shake correction function is viewed from the "−Y" direction side and the "+X" direction side. FIG. 2 is a perspective view showing the optical unit 1 with a shake correction function which is viewed from the "−Z" direction side. FIG. 3 is an exploded perspective view showing the optical unit 1 with a shake correction function which is viewed from an object side. FIG. 4 is a cross-sectional view showing the optical unit 1 with a shake correction function which is cut by the "A-A" line in FIG. 1A. FIGS. 5A and 5B are cross-sectional views showing the optical unit 1 with a shake correction function which is cut by the plane passing the first axial line "R1" and the "Z"-axis (third axial line "R3") in FIGS. 1A and 1B. FIGS. 6A and 6B are cross-sectional views showing the optical unit 1 with a shake correction function which is cut by the plane passing the second axial line "R2" and the "Z"-axis (third axial line "R3") in FIGS. 1A and 1B. The optical unit 1 with a shake correction function is, for example, used in an optical device such as a cell phone with a camera or a drive recorder, or in an optical device such as an action camera mounted on a helmet, a bicycle, a radio-controlled helicopter or the like, or a wearable camera. In the optical device, when a shake is occurred at the time of photographing, the optical unit 1 with a shake correction function is driven to correct the shake for avoiding a disturbance of a photographed image.

As shown in FIGS. 1A through 4, the optical unit 1 with a shake correction function includes an optical module 4 which holds an optical element 3, a gimbal mechanism 5 (swing support mechanism) which swingably supports the optical module 4, and a holder 6 which supports the optical module 4 through the gimbal mechanism 5. The gimbal mechanism 5 swingably supports the optical module 4 between a reference attitude where the "Z"-axis (predetermined axial line) and an optical axis are coincided with each other and an inclined attitude where the optical axis is inclined with respect to the "Z"-axis. In other words, the optical module 4 is swingably supported by the gimbal mechanism 5 around the first axial line "R1" intersecting the optical axis "L" and around the second axial line "R2" intersecting the optical axis "L" and the first axial line "R1". The first axial line "R1" and the second axial line "R2" are perpendicular to the "Z"-axis and are perpendicular to each other.

Further, the optical unit 1 with a shake correction function includes a turnable support mechanism 7 which turnably supports the holder 6, and a fixed body 8 which supports the holder 6 through the turnable support mechanism 7. The turnable support mechanism 7 is a ball bearing 9 (turnable bearing) and is structured so that the holder 6 is capable of turning around the third axial line "R3". The third axial line "R3" is the "Z"-axis direction. In this embodiment, the optical module 4, the holder 6 and the gimbal mechanism 5 structure the movable body 10 which is capable of being displaced with respect to the fixed body 8. A gyroscope 11 is attached to an end portion in the "−Z" direction of the optical module 4 as shown in FIG. 2.

In addition, the optical unit 1 with a shake correction function includes, as shown in FIGS. 2 through 6B, a magnetic swing drive mechanism 15 structured to swing the optical unit 1 around the first axial line "R1" and around the second axial line "R2", and a magnetic rolling drive mechanism 16 structured to turn the optical unit 1 and the holder 6 around the third axial line "R3". The magnetic swing drive mechanism 15 is structured between the optical unit 1 and the fixed body 8. The magnetic swing drive mechanism 15 includes a first magnetic swing drive mechanism 21 and a second magnetic swing drive mechanism 22. The magnetic rolling drive mechanism 16 is structured between the holder 6 and the fixed body 8. The magnetic rolling drive mechanism 16 is disposed between the first magnetic swing drive mechanism 21 and the second magnetic swing drive mechanism 22 around the third axial line "R3".

Further, the optical unit 1 with a shake correction function includes, as shown in FIG. 1A, a control part 2 structured to drive and control the magnetic swing drive mechanism 15 and the magnetic rolling drive mechanism 16.

(Fixed Body)

Figure 7A:
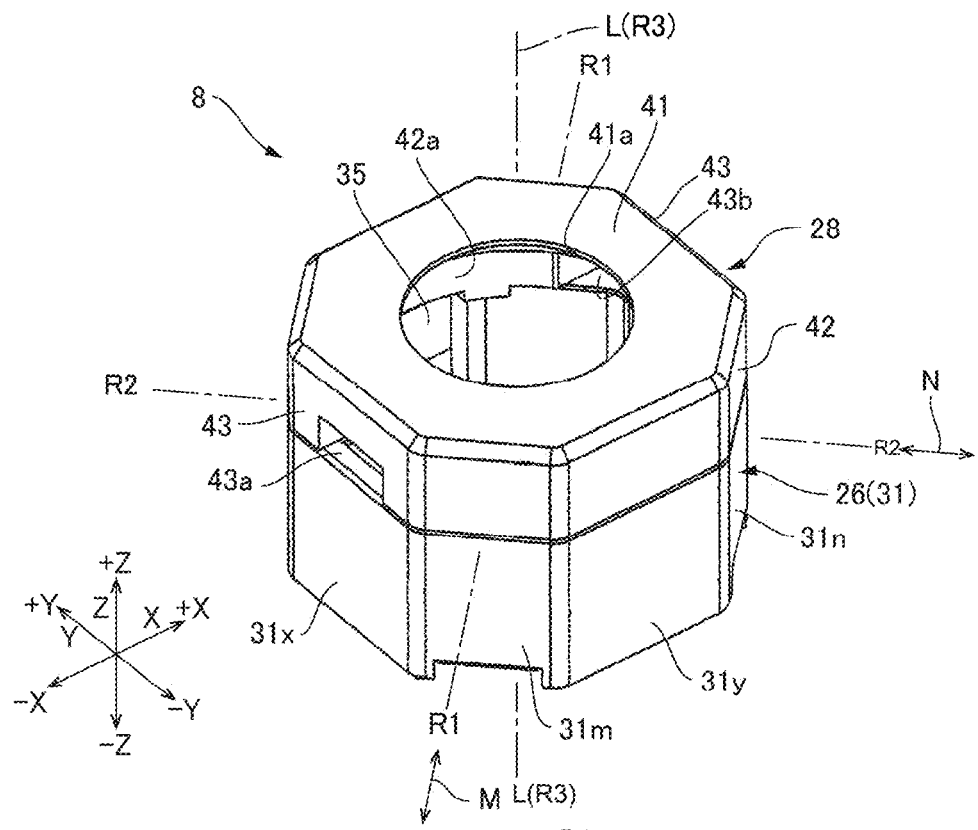
FIGS. 7A and 7B are perspective views showing a fixed body and a first case to which drive magnets are fixed.
Figure 7B:
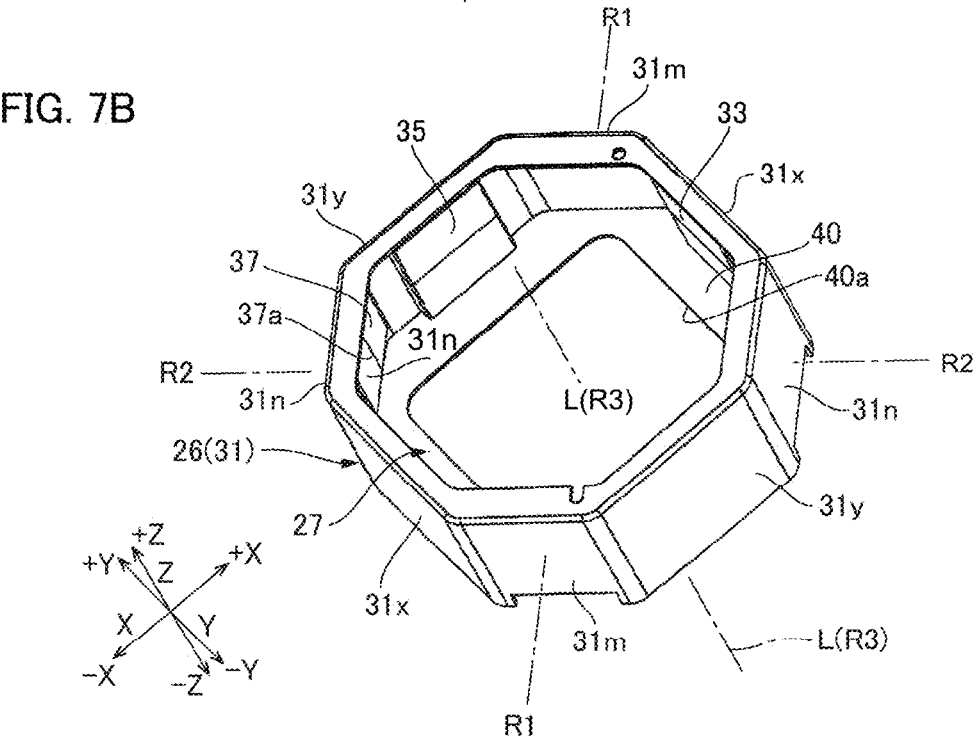

FIG. 7A is a perspective view showing the fixed body 8 and FIG. 7B is a perspective view showing a state that a third case 28 is detached from the fixed body 8. The fixed body 8 includes a first case 26 which is formed in a substantially octagonal outward shape when viewed in the "Z"-axis direction, a second case 27 which is assembled to the first case 26 from the "−Z" direction side, and a third case 28 which is assembled to the first case 26 from the "+Z" direction side.

The first case 26 is provided with a body part 31 in an octagonal tube shape which surrounds the movable body 10. The body part 31 is provided with two side plate parts 31x which face in the "X" direction and two side plate parts 31y which face in the "Y" direction. Further, the body part 31 is provided with two side wall parts 31m, which face in a first intermediate direction "M" (direction along the first axial line "R1") between the "+X" direction and the "+Y" direction, and two side wall parts 31n which face in a second intermediate direction "N" (direction along the second axial line "R2") between the "+X" direction and the "−Y" direction.

As shown in FIGS. 4 and 7B, a first drive magnet 33 (first swing drive magnet) is fixed to each of wall faces on an inner peripheral side of two side plate parts 31x facing in the "X" direction. The first drive magnets 33 structure a first magnetic swing drive mechanism 21 together with first drive coils 34 (first swing drive coil) which are attached to the optical module 4. The first drive magnet 33 is divided into two pieces in the "Z"-axis direction and is polarized and magnetized so that magnetic poles of their inner faces are different from each other at a divided position as a boundary. As shown in FIG. 7B, a second drive magnet 35 (second swing drive magnet) is fixed to each of wall faces on an inner peripheral side of two side plate parts 31y facing in the "Y" direction. The second drive magnets 35 structure a second magnetic swing drive mechanism 22 together with second drive coils 36 (second swing drive coil) which are attached to the optical module 4. The second drive magnet 35 is divided into two pieces in the "Z"-axis direction and is polarized and magnetized so that magnetic poles of their inner faces are different from each other at a divided position as a boundary.

As shown in FIG. 5A and FIGS. 7A and 7B, no magnet is fixed to wall faces on an inner peripheral side of two side wall parts 31m facing in the first intermediate direction "M" between the "+X" direction and the "+Y" direction. On the other hand, as shown in FIG. 6A, a third drive magnet 37 (rolling drive magnet) in a rectangular shape is fixed to each of wall faces on an inner peripheral side of two side wall parts 31n facing in the second intermediate direction "N" between the "+X" direction and the "−Y" direction. The third drive magnets 37 structure the magnetic rolling drive mechanism 16 together with the third drive coils 38 (rolling drive coil) attached to the optical module 4, specifically, to the holder 6. The third drive magnet 37 is divided into two pieces so as to have the same width in a circumferential direction around the "Z"-axis and is polarized and magnetized so that magnetic poles of their inner faces are different from each other at a divided position as a boundary. A magnetized polarizing line 37a of the third drive magnet 37 is extended in the "Z"-axis direction at a center in a circumferential direction of the third drive magnet 37 and is extended so as to be parallel to the optical axis "L". The third drive coil 38 is formed in a substantially rectangular frame shape and its two long sides parallel to each other are extended in parallel to the "Z"-axis direction, in other words, parallel to the optical axis "L".

The second case 27 is a plate member 40 formed in an octagonal frame shape. A rectangular opening part 40a is provided in a center portion of the second case 27.

As shown in FIG. 7A, the third case 28 is provided with an octagonal plate part 41 corresponding to an outward shape of the first case 26 and an octagonal tube part 42 which is extended to the "−Z" direction from an outer peripheral edge of the plate part 41. A circular opening 41a is provided at a center of the plate part 41. The octagonal tube part 42 is provided with a circular-shaped inner peripheral face 42a. The circular-shaped inner peripheral face 42a is coaxial with the circular opening 41a. Further, an inner diameter dimension of the circular-shaped inner peripheral face 42a is larger than that of the circular opening 41a. A first rectangular opening part 43a is provided in the side wall part 43 on the "−X" direction side of eight side wall parts 43 structuring the octagonal tube part 42. Further, as shown in FIG. 1B, a second rectangular opening part 43b is provided in the side wall part 43 on the "+X" direction side of eight side wall parts 43 structuring the octagonal tube part 42. As shown in FIG. 1A, a projection 44 (turning angle restriction part) provided in the holder 6 is inserted into an inner side of the first opening part 43a from an inner peripheral side. A flexible printed circuit board 100 is disposed on an inner side of a second opening part 43b as shown in FIG. 1B.

As shown in FIG. 4, a ball bearing 9 is inserted on an inner peripheral side of the octagonal tube part 42. An outer ring 9a of the ball bearing 9 is fixed and held by the circular-shaped inner peripheral face 42a of the octagonal tube part 42. In this embodiment, as shown in FIG. 4, a cylindrical tube part 45 provided in an end portion in the "+Z" direction of the holder 6 is inserted on an inner peripheral side of the ball bearing 9. Further, an inner ring 9b of the ball bearing 9 is held by an outer peripheral side of the cylindrical tube part 45 of the holder 6 in a pressurized state. As a result, the fixed body 8 turnably holds the holder 6. A lens barrel 51 of the optical module 4 is inserted on an inner peripheral side of the cylindrical tube part 45 of the holder 6. Therefore, the optical module 4 is inserted on an inner peripheral side of the ball bearing 9. When viewed in a direction perpendicular to the "Z" direction, a part of the lens barrel 51 is overlapped with the ball bearing 9.

(Movable Body)

Figure 8A:
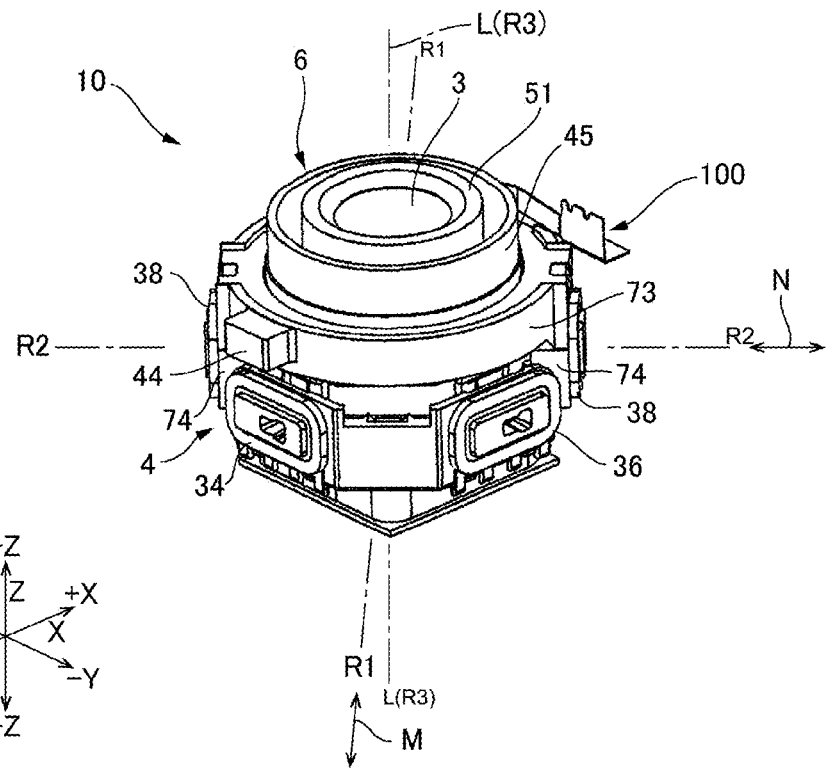
FIGS. 8A and 8B are perspective views showing a movable body.
Figure 8B:
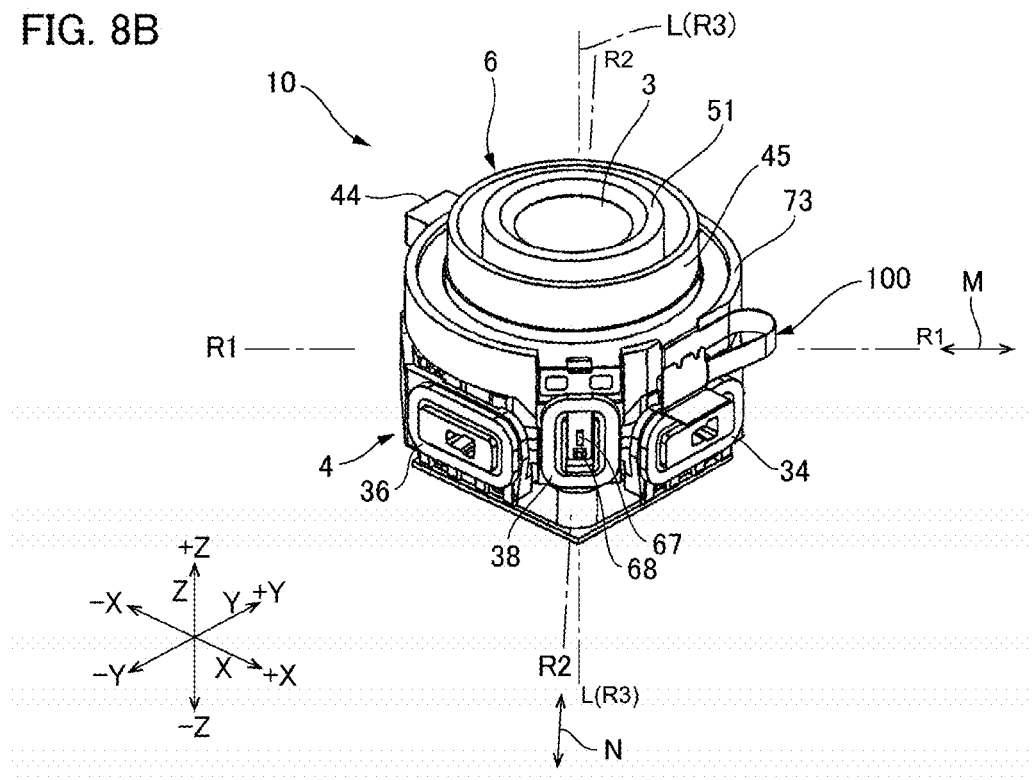

FIGS. 8A and 8B are perspective views showing the movable body 10 which is viewed from the "+Z" direction side. In FIG. 8A, the movable body 10 is viewed from the "−X" direction side and the "−Y" direction side and, in FIG. 8B, the movable body 10 is viewed from the "−Y" direction side and the "+X" direction side. As shown in FIGS. 3, 8A and 8B, the movable body 10 includes the optical module 4, the holder 6 and the gimbal mechanism 5. Further, the movable body 10 includes a spring member 47 which is provided between the optical module 4 and the holder 6.

(Optical Module)

Figure 9:
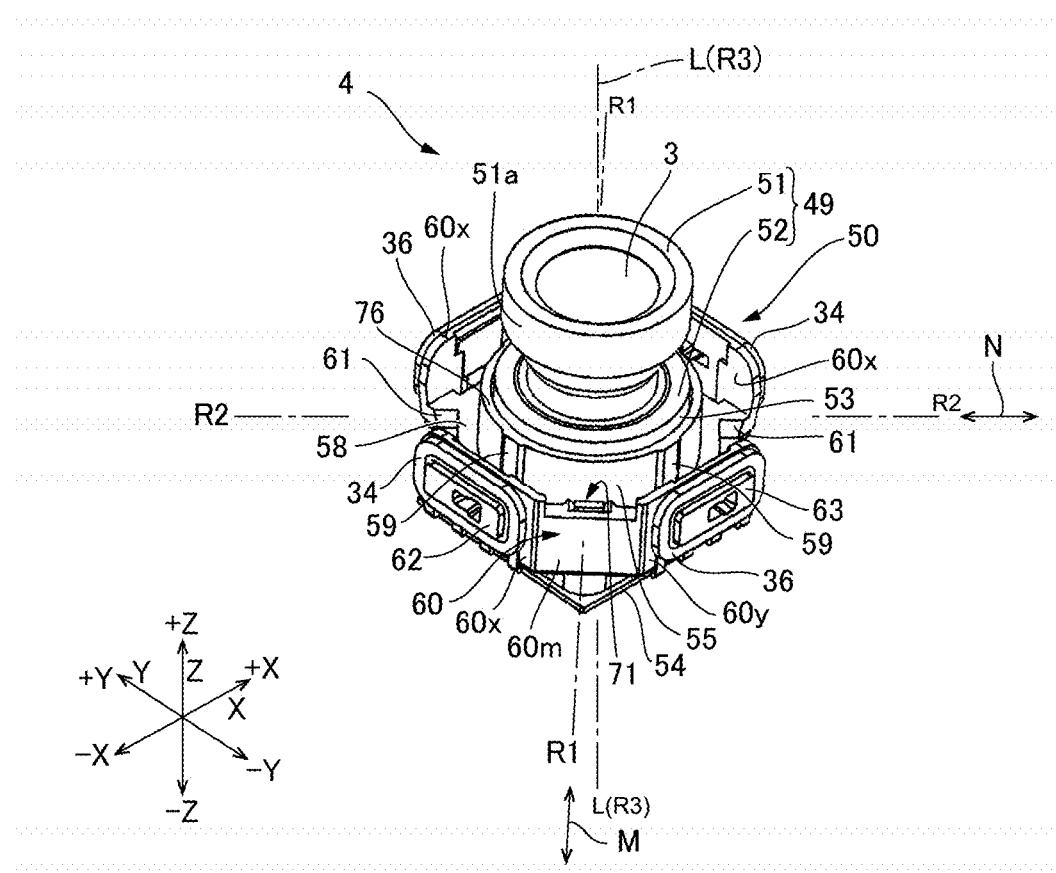
FIG. 9 is a perspective view showing an optical module.
Figure 10:
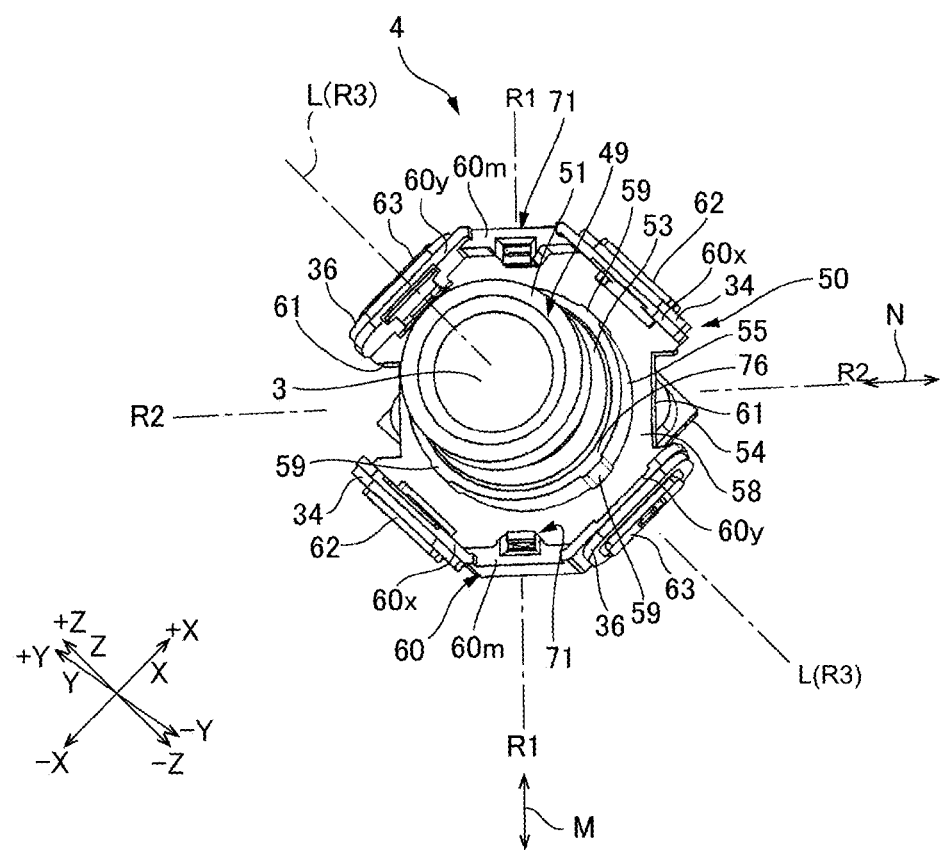
FIG. 10 is a perspective view showing the optical module.

FIGS. 9 and 10 are perspective views showing the optical module 4. As shown in FIG. 9, the optical module 4 includes a module main body part 49 having the optical element 3 and an imaging element 48 and a lens barrel holder 50 which holds the module main body part 49 from an outer peripheral side.

The module main body part 49 includes the lens barrel 51 and a lens barrel support member 52 which holds an end portion in the "−Z" direction of the lens barrel 51. The lens barrel 51 holds a plurality of optical elements 3 such as a lens on its inner peripheral side. In this embodiment, at least one of a plurality of the optical elements 3 is made of glass and other optical elements 3 are made of plastic. However, all of a plurality of the optical elements 3 may be made of plastic. The lens barrel support member 52 is, as shown in FIG. 9, provided with a tube part 53 and a rectangular plate part 54 which closes an end portion in the "−Z" direction of the tube part 53. An end portion in the "−Z" direction of the lens barrel 51 is inserted into the tube part 53 from the "+Z" direction side. As shown in FIGS. 4, 5A and 6A, the imaging element 48 is fixed to an end face on the "+Z" direction side of the rectangular plate part 54 and is located on an inner side of the tube part 53. A gyroscope 11 is fixed to a center portion of an end face on the "−Z" direction side of the rectangular plate part 54. The imaging element 48 and the gyroscope 11 are located at positions overlapping with the optical axis of the optical element 3 held by the optical module 4. A protruded portion 51a of the lens barrel 51 which is protruded from the lens barrel support member 52 to the "+Z" direction is located on an inner peripheral side with respect to the ball bearing 9 and, when viewed in a direction perpendicular to the "Z"-axis, the protruded portion 51a of the lens barrel 51 is overlapped with the ball bearing 9.

As shown in FIGS. 9 and 10, the lens barrel holder 50 is provided with a holding tube 55 extended in the "Z"-axis direction and a substantially octagonal plate part 58 enlarged to an outer peripheral side from an end in the "−Z" direction of the holding tube 55. The module main body part 49 (lens barrel support member 52) is press-fitted to the holding tube 55 in the "Z" direction and is held by the holding tube 55. The holding tube 55 is provided on its outer peripheral face with four protruded parts 59 which are protruded to the "+X" direction, the "−X" direction, the "+Y" direction and the "−Y" direction. An end face in the "+Z" direction of the holding tube 55 and end faces in the "+Z" direction of the respective protruded parts 59 are continuously formed without a step. The end face in the "+Z" direction of the holding tube 55 and the end faces in the "+Z" direction of the respective protruded parts 59 are used as an optical module side spring member fixing part 76 to which the spring member 47 is fixed. The spring member 47 is fixed to the optical module side spring member fixing part 76 through an adhesive layer which is formed on the optical module side spring member fixing part 76. Therefore, in a state that the spring member 47 is fixed, the spring member 47 is floated from the optical module side spring member fixing part 76 to the "+Z" direction. The plate part 58 is provided with six wall parts 60 which are stood up to the "+Z" direction at six positions surrounding an outer peripheral side of the holding tube 55. The six wall parts 60 are comprised of two wall parts 60x facing in the "X" direction, two wall parts 60y facing in the "Y" direction, and two wall parts 60m facing in the first intermediate direction "M". The plate part 58 is provided with cut-out parts 61 in the second intermediate direction "N" where the wall parts 60 are not formed. The lens barrel 51 is provided with the protruded portion 51a protruding from an end part of the "+Z" direction side of the lens barrel holder 50 to the "+Z" direction.

Each of two wall parts 60x facing in the "X" direction is provided with a first coil holding part 62 whose outer peripheral face holds a first drive coil 34. Each of two wall parts 60y facing in the "Y" direction is provided with a second coil holding part 63 whose outer peripheral face holds a second drive coil 36. The first coil holding part 62 and the second coil holding part 63 are rectangular protruded parts which are long in a circumferential direction around the "Z"-axis. The first drive coil 34 is fixed to the lens barrel holder 50 in a state that the first coil holding part 62 is inserted into a center hole of the first drive coil 34. The second drive coil 36 is fixed to the lens barrel holder 50 in a state that the second coil holding part 63 is inserted into a center hole of the second drive coil 36. As shown in FIG. 4, the first coil holding part 62 and the second coil holding part 63 are respectively protruded to an outer peripheral side from the centers of the drive coils 34 and 36.

Two wall parts 60m facing in the first intermediate direction "M" are provided with first contact spring holding parts 71 structuring the gimbal mechanism 5 on their inner peripheral faces.

(Holder)

Figure 11A:
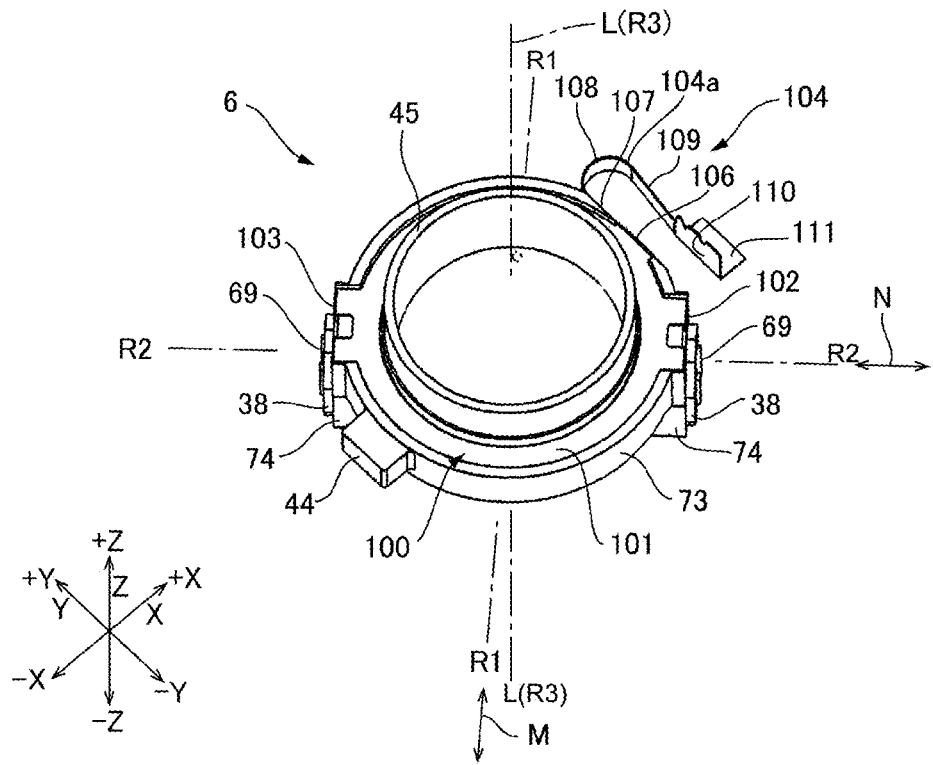
FIGS. 11A and 11B are perspective views showing a holder which are viewed from an object side and an image side.
Figure 11B:
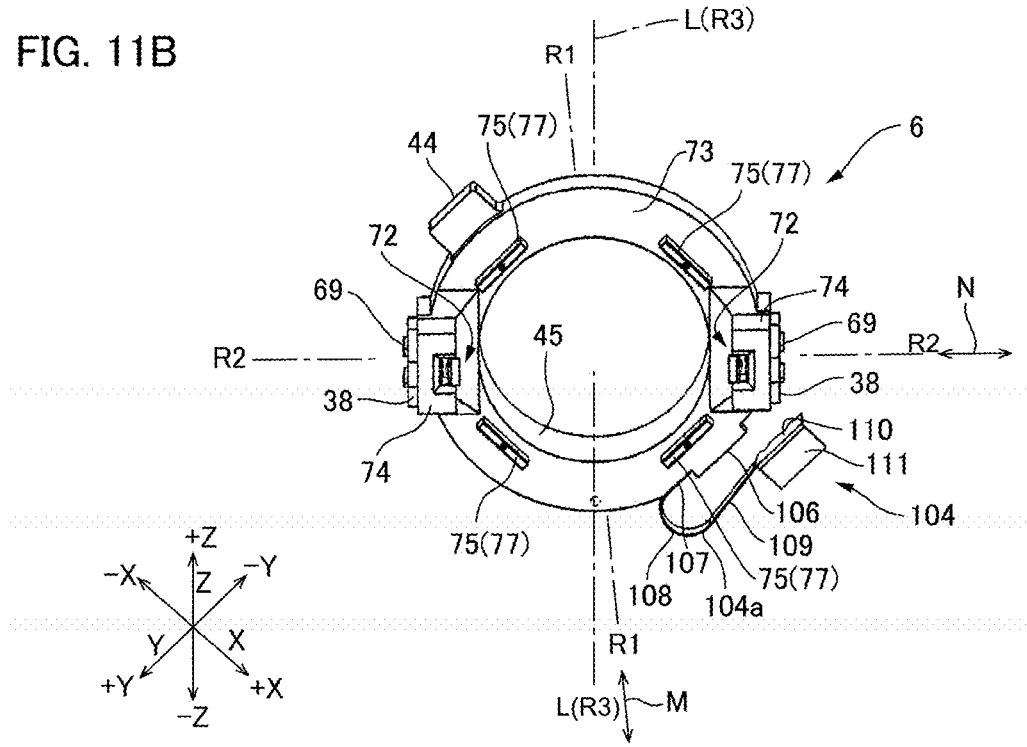
Figure 12:
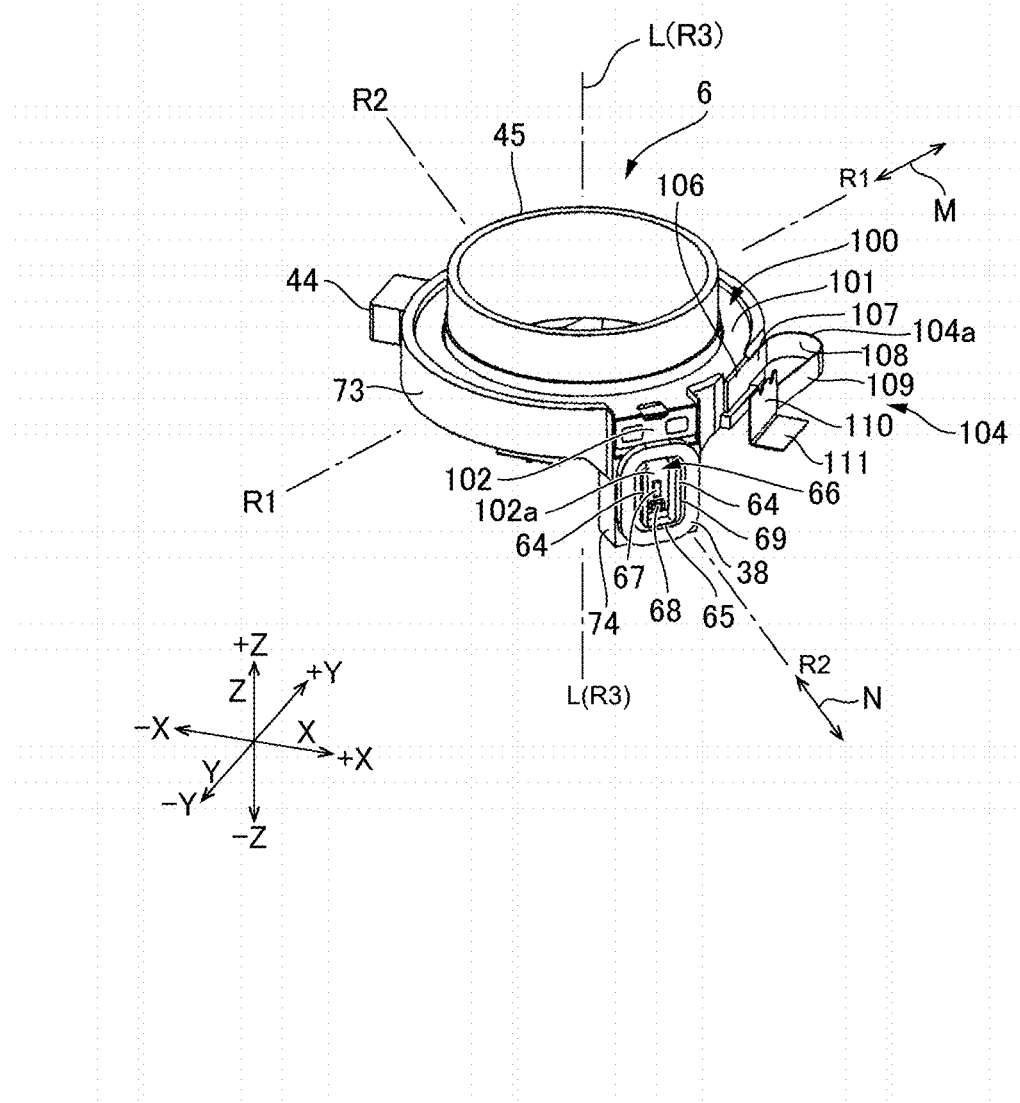
FIG. 12 is a perspective view showing a holder which is viewed from a side of a support post to which a magnetic sensor is fixed.

FIG. 11A is a perspective view showing the holder 6 which is viewed from the "+Z" direction side and FIG. 11B is a perspective view showing the holder 6 which is viewed from the "−Z" direction side. FIG. 12 is a perspective view showing the holder 6 which is viewed from the "+Z" direction side. In FIG. 12, the holder 6 is viewed from the "−Y" direction side and the "+X" direction side. As shown in FIG. 11A, the holder 6 is provided with a cylindrical tube part 45 which is inserted on an inner peripheral side of the ball bearing 9 and a ring-shaped plate part 73 which is enlarged to an outer peripheral side from an end edge in the "−Z" direction of the cylindrical tube part 45. A contour shape of the ring-shaped plate part 73 when viewed in the "Z"-axis direction is a substantially circle, and the ring-shaped plate part 73 is provided with a projection 44 which is protruded to an outer peripheral side in a part in the circumferential direction.

A pair of support posts 74 extended to the "−Z" direction is provided in portions of the ring-shaped plate part 73 at positions facing in the second intermediate direction "N" with the cylindrical tube part 45 therebetween. As shown in FIG. 11B, a tip end portion of each of the support posts 74 is provided with a second contact spring holding part 72 structuring the gimbal mechanism 5 on its inner peripheral side portion. Further, each of the support posts 74 is provided on its outer peripheral face with a third coil holding part 69 which holds the third drive coil 38. As shown in FIG. 12, the third coil holding part 69 is provided with a pair of vertical ribs 64 extended in parallel to the "Z" direction and a lateral rib 65 which connects both ends in the "−Z" direction of a pair of the vertical ribs 64. The third drive coil 38 is fixed to the lens barrel holder 50 in a state that a pair of the vertical ribs 64 and the lateral rib 65 are inserted into a center hole of the third drive coil 38. In this embodiment, a portion surrounded by a pair of the vertical ribs 64 and the lateral rib 65 in one of a pair of the support posts 74 is used as a sensor holding part 66. The sensor holding part 66 is fixed with a magnetic sensor 67 and a temperature sensor 68. In this embodiment, the magnetic sensor 67 is a Hall element. The temperature sensor 68 is a thermistor.

As shown in FIG. 11B, on both sides in the "X" direction with the cylindrical tube part 45 therebetween, rectangular projections 75 protruded to the "−Z" direction are provided on an end face portion in the "−Z" direction of the ring-shaped plate part 73. Further, rectangular projections 75 protruded to the "−Z" direction are provided on portions of the end face in the "−Z" direction of the ring-shaped plate part 73 which are located on both sides in the "Y" direction with the cylindrical tube part 45 therebetween. An end face in the "−Z" direction of each of the projections 75 is formed in a flat face and is used as a holder side spring member fixing part 77 for fixing the spring member 47. In a case that the holder 6 holds the optical module 4 through the gimbal mechanism 5, as shown in FIG. 8A, the support posts 74 of the holder 6 are inserted into portions of the optical module 4 where the wall parts 60 are not provided.

A flexible printed circuit board 100 is fixed to the holder 6. The flexible printed circuit board 100 is connected with two third drive coils 38, the magnetic sensor 67 and the temperature sensor 68. The flexible printed circuit board 100 is provided with a circular circuit board portion 101 into which the cylindrical tube part 45 is inserted and coil connected parts 102 and 103 which are protruded to an outer side from an outer peripheral edge portion of the circular circuit board portion 101 on one side and the other side in the second intermediate direction "N" with its center hole therebetween. Further, the flexible printed circuit board 100 is provided with a circuit board extended part 104 which is protruded to an outer peripheral side from an outer peripheral edge portion of the circular circuit board portion 101 which is close to the coil connected part 102.

The circular circuit board portion 101 is fixed to the holder 6 with a posture along an end face in the "+Z" direction of the ring-shaped plate part 73. The coil connected part 102 is bent from the circular circuit board portion 101 to the "−Z" direction along a side face of the ring-shaped plate part 73 and is connected with one of the third drive coils 38. The coil connected part 103 is bent from the circular circuit board portion 101 to the "−Z" direction along the side face of the ring-shaped plate part 73 and is connected with the other of the third drive coils 38. In this embodiment, the coil connected part 102 is provided with the extended part 102a which is extended on an inner side of the third drive coil 38. The magnetic sensor 67 and the temperature sensor 68 are mounted on the extended part 102a.

The circuit board extended part 104 is provided with an inner side fixed portion 106, which is bent from the circular circuit board portion 101 to the "−Z" direction along the side face of the ring-shaped plate part 73 and is fixed to the side face of the ring-shaped plate part 73, an inner side extended portion 107 extended to one side in a circumferential direction from the inner side fixed portion 106, a curved portion 108, which is curved toward an outer peripheral side from a tip end of the inner side extended portion 107 to a direction returning to a side of the inner side fixing portion 106, an outer side extended portion 109 continuously extended to the other side in the circumferential direction from the curved portion 108, an outer side fixed portion 110 continuously extended from a tip end of the outer side extended portion 109, and a connected portion 111 which is extended to an outer peripheral side from an end edge in the "−Z" direction of the outer side fixed portion 110. Each of thickness directions of the inner side extended portion 107 and the outer side extended portion 109 is directed to a direction perpendicular to the "Z"-axis. Further, the inner side extended portion 107 and the outer side extended portion 109 face each other through a gap space therebetween in a radial direction. In this embodiment, the outer side extended portion 109 is, as shown in FIG. 1B, fixed to an outer peripheral face portion of the third case 28 of the fixed body 8 which is adjacent to the second opening part 43b in the circumferential direction. A flexible part 104a of the circuit board extended part 104 structured of the inner side extended portion 107, the curved portion 108 and the outer side extended portion 109 is overlapped with the second opening part 43b when viewed in a direction perpendicular to the "Z"-axis, and at least a part of the flexible part 104a is located on an inner side of the second opening part 43b.

(Gimbal Mechanism)

Figure 13:
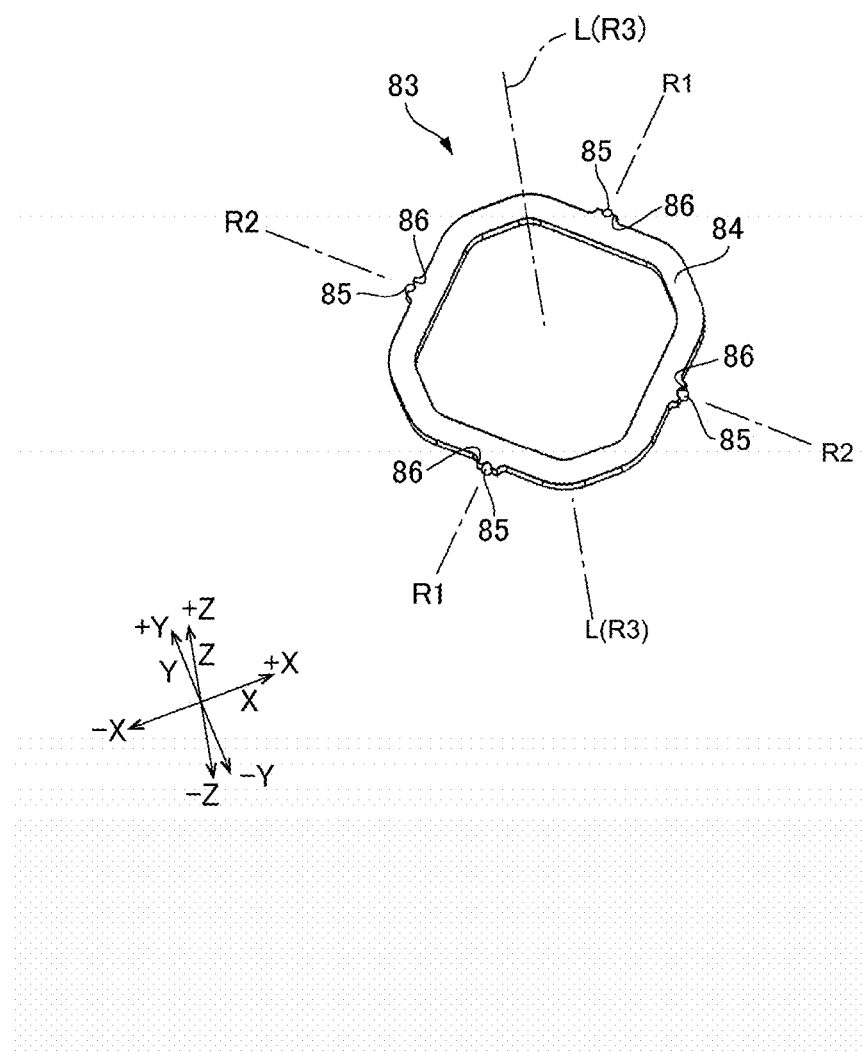
FIG. 13 is a perspective view showing a movable frame.
Figure 14:
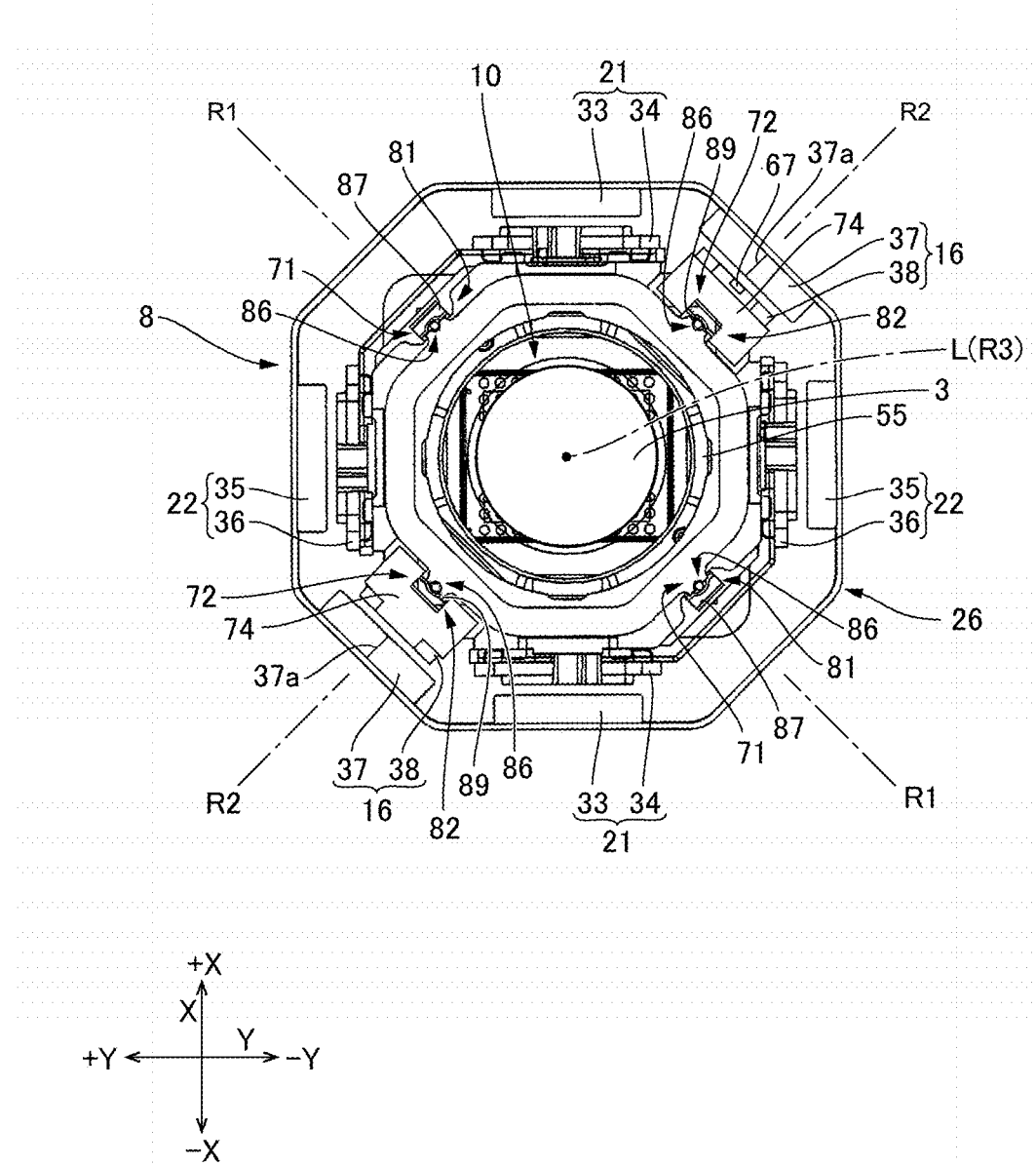
FIG. 14 is a cross-sectional view showing the optical unit with a shake correction function which is cut by a plane perpendicular to an axial line.

The gimbal mechanism 5 will be described below with reference to FIGS. 5A through 6B, and FIGS. 13 and 14. FIG. 13 is a perspective view showing a movable frame 83. FIG. 14 is a cross-sectional view showing the optical unit 1 with a shake correction function which is cut by a plane perpendicular to the "Z"-axis. The gimbal mechanism 5 is structured between the optical module 4 (lens barrel holder 50) and the holder 6. The gimbal mechanism 5 includes, when the optical module 4 is assembled to the holder 6, first swing support parts 81 (optical module side support parts, see FIGS. 5A and 5B), which are disposed at two positions separated from each other in the first axial line "R1" direction, and second swing support parts 82 (holder side support parts, see FIGS. 6A and 6B) which are disposed at two positions separated from each other in the second axial line "R2" direction. Further, the gimbal mechanism 5 includes a movable frame 83 (frame body) which is supported by the first swing support parts 81 and the second swing support parts 82. The first swing support parts 81 are provided in the optical module 4 and the second swing support parts 82 are provided in the holder 6.

The movable frame 83 is provided with a frame-shaped gimbal spring 84 formed in a substantially octagonal shape as shown in FIG. 13. The gimbal spring 84 is provided with a frame part having a constant width and supporting point parts 86 provided at four positions of the frame part around the optical axis "L". The supporting point part 86 is protruded to an outer side from a center in the circumferential direction of each of four side portions of the octagonal shape. Each of spherical bodies 85 is fixed to an outer peripheral face of each of the supporting point parts 86 by welding or the like. A convex surface in a hemispheric shape facing to an outer side of the movable frame 83 is provided at each of the supporting point parts 86 by the spherical body 85. The first swing support parts 81 and the second swing support parts 82 support the respective supporting point parts 86 from an outer peripheral side. In this embodiment, the gimbal spring 84 is a laminated body structured of a plurality of plate-shaped springs which are laminated in the optical axis "L" direction ("Z"-axis direction).

As shown in FIGS. 5A and 5B, the first swing support part 81 includes a first contact spring holding part 71 provided in the lens barrel holder 50 of the optical module 4, a first contact point spring 87 which is held by the first contact spring holding part 71, and an elastic adhesive 88. The first contact point spring 87 is a metal plate spring which is bent in a "U"-shape. As shown in FIG. 5B, the first contact point spring 87 is provided with an inner side plate spring part 87a extended in the "Z" direction, an outer side plate spring part 87b which is extended in the "Z" direction on an outer peripheral side with respect to the inner side plate spring part 87a with a gap space between the inner side plate spring part 87a and the outer side plate spring part 87b, and a connection spring part 87c which is extended in a radial direction and connects an end in the "−Z" direction of the inner side plate spring part 87a with an end in the "−Z" direction of the outer side plate spring part 87b. Thickness directions of the inner side plate spring part 87a and the outer side plate spring part 87b are directed to the radial direction. The inner side plate spring part 87a is provided with a spring side contact point part 87d formed in a hemispheric recessed part. The spherical body 85 welded to the supporting point part 86 of the movable frame 83 is contacted with the spring side contact point part 87d from an inner peripheral side. In this manner, the movable frame 83 is relatively swingably supported by the optical module 4 (first swing support part 81). The elastic adhesive 88 is filled between the inner side plate spring part 87a and the outer side plate spring part 87b. The elastic adhesive 88 provides elasticity in a hardened state.

As shown in FIGS. 6A and 6B, the second swing support part 82 include a second contact spring holding part 72 provided in each of the support posts 74 of the holder 6, a second contact point spring 89 which is held by the second contact spring holding part 72, and an elastic adhesive 90. The second contact point spring 89 is a metal plate spring which is bent in a "U"-shape and is the same shape as the first contact point spring 87. In other words, the second contact point spring 89 is provided with an inner side plate spring part 89a extended in the "Z" direction, an outer side plate spring part 89b which is extended in the "Z" direction on an outer peripheral side with respect to the inner side plate spring part 89a with a gap space between the inner side plate spring part 89a and the outer side plate spring part 89b, and a connection spring part 89c which is extended in a radial direction and connects an end in the "+Z" direction of the inner side plate spring part 89a with an end in the "+Z" direction of the outer side plate spring part 89b. Thickness directions of the inner side plate spring part 89a and the outer side plate spring part 89b are directed to the radial direction. The inner side plate spring part 89a is provided with a spring side contact point part 89d formed in a hemispheric recessed part. The spherical body 85 welded to the supporting point part 86 of the movable frame 83 is contacted with the spring side contact point part 89d from an inner peripheral side. In this manner, the movable frame 83 is swingably supported by the holder 6 (second swing support part 82). The elastic adhesive 90 is filled between the inner side plate spring part 89a and the outer side plate spring part 89b. The elastic adhesive 90 provides elasticity in a hardened state.

In a state that the optical module 4 is held by the holder 6 through the gimbal mechanism 5, as shown in FIG. 14, the optical module 4 is swingably supported around two axial lines, i.e., around the first axial line "R1" which passes a pair of the supporting point parts 86 of the movable frame 83 supported by the first swing support parts 81 of the optical module 4 and, around the second axial line "R2" which passes a pair of the supporting point parts 86 of the movable frame 83 supported by the second swing support parts 82 of the holder 6.

(Spring Member)

The spring member 47 is, as shown in FIGS. 4, 5A and 6A, provided between the optical module side spring member fixing part 76 of the optical module 4 and the holder side spring member fixing part 77 (projections 75 of ring-shaped plate part 73) of the holder 6 and connects the optical module 4 with the holder 6. A reference posture of the optical module 4 in a stationary state is determined by the spring member 47. In the reference posture, the optical axis of the optical module 4 and the "Z"-axis are coincided with each other.

As shown in FIG. 3, the spring member 47 is a plate spring which is made of a metal plate formed in a rectangular frame shape. The spring member 47 is provided with four holder side connecting parts 91 provided on its outer peripheral part. The respective holder side connecting parts 91 are fixed to the holder side spring member fixing part 77 (projections 75 of the ring-shaped plate part 73) and, as a result, the spring member 47 is connected with the holder 6. Further, the spring member 47 is provided with an optical module side connecting part 92 in a circular frame shape on its inner peripheral part. The optical module side connecting part 92 of the spring member 47 is fixed to the optical module side spring member fixing part 76 through an adhesive layer and, as a result, the spring member 47 is connected with the optical module 4. The holder side connecting parts 91 and the optical module side connecting part 92 are connected with each other through arm parts 93.

The arm part 93 is curved between the optical module side spring member fixing part 76 and the holder side connecting part 91.

(Shake Correction Drive Mechanism)

In this embodiment, in a state that the holder 6 which holds the optical module 4 is held by the fixed body 8 through the ball bearing 9, as shown in FIGS. 4 and 14, on the "+X" direction side and the "−X" direction side of the lens barrel 51 of the optical module 4, the first drive coil 34 fixed to the optical module 4 and the first drive magnet 33 fixed to the fixed body 8 face each other to structure the first magnetic swing drive mechanism 21. Further, in a state that the holder 6 which holds the optical module 4 is held by the fixed body 8 through the ball bearing 9, as shown in FIG. 14, on the "+Y" direction side and the "−Y" direction side of the lens barrel 51 of the optical module 4, the second drive coil 36 fixed to the optical module 4 and the second drive magnet 35 fixed to the fixed body 8 face each other to structure the second magnetic swing drive mechanism 22.

The magnetic swing drive mechanism 15 swings the optical module 4 around the first axial line "R1" and around the second axial line "R2" by a resultant force of a magnetic-drive force generated by power feeding to the first magnetic swing drive mechanism 21 and a magnetic-drive force generated by power feeding to the second magnetic swing drive mechanism 22. Power feeding to the first drive coils 34 and the second drive coils 36 is controlled based on a detected result of a shake by the gyroscope 11. In other words, a drive current is supplied to the first drive coils 34 and the second drive coils 36 for driving the optical module 4 in a direction for cancelling the shake detected by the gyroscope 11. As a result, the optical module 4 is swung in an opposite direction to the shake around the first axial line "R1" and is swung in an opposite direction to the shake around the second axial line "R2" and thus shakes in the pitching direction and the yawing direction are corrected.

In addition, in the state that the holder 6 which holds the optical module 4 is held by the fixed body 8 through the ball bearing 9, as shown in FIGS. 6A and 14, on one side and the other side of the lens barrel 51 of the optical module 4, the third drive coils 38 fixed to the holder 6 and the third drive magnets 37 fixed to the fixed body 8 face each other to structure the magnetic rolling drive mechanism 16. These two sets of the third drive coils 38 and the third drive magnets 37 are provided so as to generate magnetic-drive forces of the same direction around the "Z"-axis (third axial line "R3") when power is supplied through the flexible printed circuit board 100. Therefore, a shake correction around the "Z"-axis (third axial line "R3") can be performed by supplying an electric current to the two third drive coils 38.

In this embodiment, in a case that the optical module 4 is located at a predetermined home position around the "Z"-axis, as shown in FIG. 14, the magnetic sensor 67 mounted on the optical module 4, in other words, fixed to the holder 6 faces the magnetized polarizing line 37a of the third drive magnet 37.

(Control System)

Figure 15:
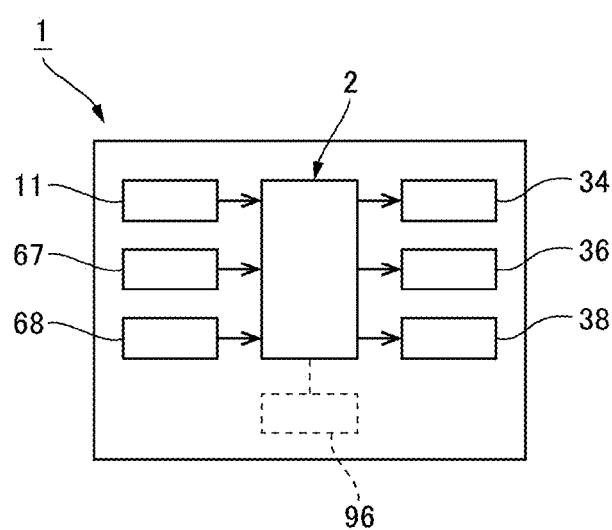
FIG. 15 is a schematic block diagram showing a control system for the optical unit with a shake correction function.

FIG. 15 is a schematic block diagram showing a control system for the optical unit 1 with a shake correction function. A control system for the optical unit 1 with a shake correction function is mainly structured of the control part 2 comprising a CPU and a memory. The gyroscope 11, the magnetic sensor 67 and the temperature sensor 68 are connected with an input side of the control part 2. The first drive coils 34, the second drive coils 36 and the third drive coils 38 are connected with an output side of the control part 2. Drive circuit parts (not shown) for supplying electric currents to the respective drive coils 34, 36 and 38 are provided between the control part 2 and the respective drive coils 34, 36 and 38.

Power feeding to the first drive coils 34 and the second drive coils 36 by the control part 2 is controlled based on a detected result of a shake by the gyroscope 11. In other words, the control part 2 supplies a drive current to the first drive coils 34 and the second drive coils 36 so that the optical module 4 is driven in a direction for cancelling a shake detected by the gyroscope 11. As a result, the optical module 4 is swung in an opposite direction to the shake around the first axial line "R1" and is swung in an opposite direction to the shake around the second axial line "R2" and the shakes in the pitching direction and the yawing direction are corrected.

In this embodiment, the first coil holding parts 62 and the second coil holding parts 63 are respectively protruded to an outer peripheral side from the centers of the drive coils 34 and 36. Therefore, when the movable body 10 is moved to the "X"-axis direction or the "Y"-axis direction due to a swing, an impact or the like, the first coil holding part 62 and the second coil holding part 63 are abutted with the facing magnets 33 and 35 and a moving range of the optical module 4 can be restricted. Accordingly, deformation of the spring member 47 can be suppressed.

Power feeding to the third drive coils 38 by the control part 2 is controlled so that the optical module 4, in other words, the holder 6 is returned to the predetermined home position around the "Z"-axis based on a detected result of a shake by the magnetic sensor 67. In this embodiment, the home position of the optical module 4 is a position where the magnetic sensor 67 mounted on the optical module 4 faces the magnetized polarizing line 37a of the third drive magnet 37. The state that the optical module 4 is located at the home position is shown in FIG. 14.

For example, when the optical module 4 is swung around the "Z"-axis, the magnetic sensor 67 is moved to one of magnetized portions of an "N"-pole and an "S"-pole from the magnetized polarizing line 37a. As a result, an output (voltage output) from the magnetic sensor 67 is varied based on a displaced amount (shake amount) of the optical module 4. Further, the output from the magnetic sensor 67 is varied to a plus side with respect to a reference voltage in a case that the optical module 4 is swung to one side around the "Z"-axis with the home position (magnetized polarizing line 37a) as a boundary and, when the optical module 4 is swung to the other side, the output from the magnetic sensor 67 is varied to a minus side with respect to the reference voltage. In this manner, an output from the magnetic sensor 67 is varied corresponding to a shake amplitude and a shake direction. Therefore, a drive current for driving the optical module 4 in a direction for cancelling the shake detected by the magnetic sensor 67 is supplied from the control part 2 based on the output from the magnetic sensor 67. As a result, the optical module 4 is swung in an opposite direction to the shake around the third axial line "R3" and thus the shake in the rolling direction is corrected and the magnetic sensor 67 fixed to the holder 6 is returned to the home position.

In this embodiment, the optical unit 1 with a shake correction function is provided with no spring member or the like which mechanically returns the optical module 4 to the home position. Therefore, the control part 2 always controls power feeding to the third drive coils 38 based on an output from the magnetic sensor 67 so that the optical module 4 is located at the home position.

The temperature sensor 68 which is fixed to the sensor holding part 66 together with the magnetic sensor 67 is used for correcting an output from the magnetic sensor 67. In other words, characteristics of the magnetic sensor 67 such as a Hall element are varied due to heat. Further, temperature in a space surrounded by the third drive coil 38 is varied due to heat generated by the third drive coil 38 through power feeding. Therefore, the control part 2 corrects an output from the magnetic sensor 67 based on an output (temperature) from the temperature sensor 68 and, as a result, lowering of accuracy for a shake correction in the rolling direction due to temperature change is restrained.

In this embodiment, as shown in FIG. 1A, when the holder 6 which holds the optical module 4 is to be held by the fixed body 8 through the ball bearing 9, the projection 44 of the holder 6 is inserted into the first opening part 43a of the third case 28 of the fixed body 8. Therefore, the projection 44 and the first opening part 43a of the third case 28 structure a turning angle range restriction mechanism 95 which restricts a turning angle range around the "Z"-axis of the holder 6 (optical module 4). In other words, when the holder 6 is excessively turned around the "Z"-axis, an inner peripheral wall face of the first opening part 43a of the third case 28 is abutted with the projection 44 in a circumferential direction around the "Z"-axis to restrict the turning.

(Operations and Effects)

According to this embodiment, the home position around the "Z"-axis of the movable body 10 comprising the optical module 4 can be obtained based on an output from the magnetic sensor 67. Further, when power feeding to the third drive coils 38 is controlled based on the output from the magnetic sensor 67, a shake correction around the "Z"-axis of the movable body 10 can be performed. Therefore, the movable body 10 comprising the holder 6 which holds the optical module 4 can be returned to the home position around the "Z"-axis without using a spring member or the like.

In this embodiment, the magnetic sensor 67 is disposed in an inner side opening of the third drive coil 38 which is formed in a substantially rectangular frame shape. Therefore, the magnetic sensor 67 can be disposed by utilizing a free space of the opening of the third drive coil 38. Further, the magnetic sensor 67 is located in the opening of the third drive coil 38 and thus it is easy to make the magnetic sensor 67 face to the magnetized polarizing line 37a of the third drive magnet 37.

In addition, in this embodiment, the magnetic sensor 67 is faced to the center in the "Z"-axis direction of the third drive magnet 37 at the home position. Therefore, the magnetic sensor 67 is disposed at a position where the magnetic flux is relatively strong and thus an output from the magnetic sensor 67 can be secured.

Further, in this embodiment, the temperature sensor 68 is disposed in the opening of the third drive coil 38 together with the magnetic sensor 67. Characteristics of the magnetic sensor 67 such as a Hall element are varied due to heat. Further, temperature of a space surrounded by the third drive coil 38 is varied due to heat generated by the third drive coil 38 through power feeding. Therefore, in a case that the temperature sensor 68 is disposed in the vicinity of the magnetic sensor 67 and an output from the magnetic sensor 67 is corrected based on an output (temperature) from the temperature sensor 68, lowering of accuracy of a shake correction caused by temperature change can be restrained in the rolling direction.

Modified Embodiments

It may be structured that the home position of the optical module 4 is set at a position different from a position where the magnetic sensor 67 and the magnetized polarizing line 37a face each other. For example, it may be structured that a home position is set at a position where the magnetic sensor 67 is disposed at a center of a turning angle range of the holder 6 (optical module 4) determined by the turning angle range restriction mechanism 95. In a case that the home position is set at the position, as shown by the dotted line in FIG. 15, a storage part 96 structured of a nonvolatile memory is connected with the control part 2. Further, in advance, the holder 6 (optical module 4) is turned over the turning angle range while monitoring an output of the magnetic sensor 67, and an output value outputted from the magnetic sensor 67 at the center of the turning angle range is memorized in the storage part 96. The control part 2 sets a position where an output from the magnetic sensor 67 and an output value memorized in the memory are matched with each other as the home position. Further, the control part 2 controls power feeding to the third drive coils 38 with the output value memorized in the memory as the reference voltage to make the optical module 4 locate at the home position.

In this embodiment, the respective drive magnets 33, 35 and 37 structuring the magnetic swing drive mechanism 15 and the magnetic rolling drive mechanism 16 are fixed to the fixed body 8, and the first and the second drive coils 34 and 36 are fixed to the optical module 4 and the third drive coils 38 are fixed to the holder 6. However, it may be structured that the respective drive magnets 33, 35 and 37 are oppositely disposed to the corresponding drive coils 34, 36 and 38, and their arrangements are not limited to the above-mentioned embodiment. Therefore, the first and the second drive magnets 33 and 35 and the first and the second drive coils 34 and 36 may be disposed on either of the optical module 4 and the fixed body 8. Further, it may be structured that the third drive magnets 37 are disposed on the holder 6 and the third drive coils 38 are disposed on the fixed body 8. In this case, in the holder 6 and the fixed body 8, the magnetic sensor 67 may be fixed to the same side as the third drive coil 38 so as to face the third drive magnet 37.

In addition, in the embodiment described above, the magnetic rolling drive mechanism 16 includes two pairs of the third drive coils 38 and the third drive magnets 37. However, the magnetic rolling drive mechanism 16 may include one pair of the third drive coil 38 and the third drive magnet 37. Further, the magnetic rolling drive mechanism 16 may include four pairs of the third drive coils 38 and the third drive magnets 37. In this case, two newly added pairs of the third drive coils 38 and the third drive magnets 37 may be disposed on one side and the other side of the lens barrel 51 of the optical module 4 in the first intermediate direction "M".

At least an embodiment of the present invention may be applied to a conventional optical unit with a shake correction function in which the magnetic swing drive mechanism 15 is structured between the optical module 4 and the holder 6. In other words, at least an embodiment of the present invention may be applied to an optical unit with a shake correction function in which the first drive magnet 33 and the second drive magnet 35 structuring the magnetic swing drive mechanism 15 are fixed to one of the optical module 4 and the holder 6, and the first drive coil 34 and the second drive coil 36 structuring the magnetic swing drive mechanism 15 are fixed to the other of the optical module 4 and the holder 6, and the optical module 4, the holder 6 and the magnetic swing drive mechanism 15 structure the movable body.

In this case, the fixed body 8 turnably holds the holder 6 through the turnable support mechanism 7. Further, the third drive magnet 37 structuring the magnetic rolling drive mechanism 16 is fixed to one of the holder 6 and the fixed body 8, and the third drive coil is fixed to the other of the holder 6 and the fixed body 8. Further, the magnetic sensor 67 is fixed to a member to which the third drive coil is fixed so as to face the magnetized polarizing line 37a of the third drive magnet 37. As a result, a home position of the holder 6 which holds the optical module 4 can be obtained based on an output from the magnetic sensor 67. Further, the control part controls power feeding to the rolling drive coil based on an output from the magnetic sensor and a shake correction around a turning axis can be performed.

Further, in this embodiment, a ball bearing 9 is used as the turnable support mechanism 7 which turnably supports the holder 6. However, a turnable bearing such as a slide bearing may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, the optical unit comprising:
   a movable body comprising:
      an optical module structured to hold an optical element;
      a swing support mechanism structured to swingably support the optical module between a reference posture where a predetermined axial line and an optical axis are coincided with each other and an inclined posture where the optical axis is inclined with respect to the axial line; and
      a holder which holds the optical module through the swing support mechanism;
   a fixed body which turnably holds the movable body around the axial line;
   a magnetic swing drive mechanism structured to swing the optical module; and
   a magnetic rolling drive mechanism structured to turn the movable body around the axial line;
   wherein the magnetic rolling drive mechanism comprises:
      a rolling drive magnet which is fixed to one of the movable body and the fixed body; and
      a rolling drive coil and a magnetic sensor which are fixed to an other of the movable body and the fixed body so as to face the rolling drive magnet;
   wherein the rolling drive magnet is polarized and magnetized in a circumferential direction around the axial line; and
   wherein power feeding to the rolling drive coil is controlled based on an output from the magnetic sensor so as to set the movable body at a predetermined home position around the axial line.

2. The optical unit with a shake correction function according to claim 1, wherein the magnetic sensor faces a magnetized polarizing line of the rolling drive magnet at the home position.

3. The optical unit with a shake correction function according to claim 2, further comprising a turnable support mechanism structured to turnably support the holder around the axial line,
    wherein the fixed body holds the holder through the turnable support mechanism, and
    wherein the rolling drive magnet is fixed to one of the holder and the fixed body, and the rolling drive coil and the magnetic sensor are fixed to an other of the holder and the fixed body.

4. The optical unit with a shake correction function according to claim 1, further comprising:
    a turning angle range restriction mechanism structured to restrict a turning angle range over which the movable body is turnable around the axial line; and
    a storage part in which an output value outputted from the magnetic sensor when the movable body is located at a center of the turning angle range is memorized,
    wherein the output value memorized in the storage part and an output from the magnetic sensor correspond with each other at the home position.

5. The optical unit with a shake correction function according to claim 4, further comprising a turnable support mechanism structured to turnably support the holder around the axial line,
    wherein the fixed body holds the holder through the turnable support mechanism, and
    wherein the rolling drive magnet is fixed to one of the holder and the fixed body, and the rolling drive coil and the magnetic sensor are fixed to an other of the holder and the fixed body.

6. The optical unit with a shake correction function according to claim 1, further comprising a turnable support mechanism structured to turnably support the holder around the axial line,
    wherein the fixed body holds the holder through the turnable support mechanism, and
    wherein the rolling drive magnet is fixed to one of the holder and the fixed body, and the rolling drive coil and the magnetic sensor are fixed to an other of the holder and the fixed body.

7. The optical unit with a shake correction function according to claim 6, wherein
    the rolling drive magnet is fixed to the fixed body, and
    the rolling drive coil and the magnetic sensor are fixed to the holder.

8. The optical unit with a shake correction function according to claim 6, wherein the magnetic swing drive mechanism comprises a swing drive magnet which is fixed to one of the optical module and the fixed body, and a swing drive coil which is fixed to an other of the optical module and the fixed body so as to face the swing drive magnet.

9. The optical unit with a shake correction function according to claim 8, wherein
    the magnetic swing drive mechanism comprises a swing drive magnet which is fixed to the fixed body and a swing drive coil which is fixed to the optical module so as to face the swing drive magnet, and
    the optical module is held by the holder through a gimbal mechanism which is the swing support mechanism.

10. The optical unit with a shake correction function according to claim 6, wherein
    the movable body comprises the magnetic swing drive mechanism, and
    the magnetic swing drive mechanism comprises:
        a swing drive magnet which is fixed to one of the optical module and the holder; and
        a swing drive coil which is fixed to an other of the optical module and the holder so as to face the swing drive magnet.

11. The optical unit with a shake correction function according to claim 6, further comprising a control part structured to control power feeding to the rolling drive coil based on an output from the magnetic sensor.

12. The optical unit with a shake correction function according to claim 11, wherein the control part is structured to set a position where the magnetic sensor faces a magnetized polarizing line of the rolling drive magnet as the home position.

13. The optical unit with a shake correction function according to claim 11, further comprising:
    a turning angle range restriction mechanism structured to restrict a turning angle range over which the movable body is turnable around the axial line; and
    a storage part in which an output value outputted from the magnetic sensor when the movable body is located at a center of the turning angle range is memorized,
    wherein the control part is structured to set a position where the output value memorized in the storage part and an output from the magnetic sensor correspond with each other as the home position.

14. The optical unit with a shake correction function according to claim 6, wherein
    the rolling drive coil is formed in a frame shape whose center is opened, and
    the magnetic sensor is disposed in an opening of the rolling drive coil which is formed in the frame shape.

15. The optical unit with a shake correction function according to claim 14, wherein
    the rolling drive coil is formed in a substantially rectangular frame shape whose two long sides are extended in an axial line direction,
    the magnetic sensor is disposed at a middle position in the circumferential direction with respect to the two long sides, and
    the magnetic sensor faces a magnetized polarizing line of the rolling drive magnet at the home position.

16. The optical unit with a shake correction function according to claim 14, further comprising a temperature sensor,
    wherein the temperature sensor is disposed in the opening of the rolling drive coil.

17. The optical unit with a shake correction function according to claim 1, wherein the magnetic sensor faces a center of the rolling drive magnet in an axial line direction.

18. The optical unit with a shake correction function according to claim 1, wherein the magnetic sensor is a Hall element.

* * * * *